(12) United States Patent
Rissanen et al.

(10) Patent No.: US 10,113,006 B2
(45) Date of Patent: Oct. 30, 2018

(54) RELEASE LINER COMPRISING NANOFIBRILLAR CELLULOSE

(71) Applicant: UPM-KYMMENE CORPORATION, Helsinki (FI)

(72) Inventors: Mikko Rissanen, Kauniainen (FI); Markus Nuopponen, Helsinki (FI)

(73) Assignee: UPM SPECIALTY PAPERS OY, Helsinki (FI)

( * ) Notice: Subject to any disclaimer, the term of this patent is extended or adjusted under 35 U.S.C. 154(b) by 0 days.

(21) Appl. No.: 15/314,222

(22) PCT Filed: Jun. 26, 2014

(86) PCT No.: PCT/FI2014/050528
§ 371 (c)(1),
(2) Date: Nov. 28, 2016

(87) PCT Pub. No.: WO2015/197906
PCT Pub. Date: Dec. 30, 2015

(65) Prior Publication Data
US 2017/0190799 A1   Jul. 6, 2017

(51) Int. Cl.
C08B 15/02 (2006.01)
D21H 27/30 (2006.01)
C08B 3/20 (2006.01)
C09J 7/40 (2018.01)

(52) U.S. Cl.
CPC .............. *C08B 15/02* (2013.01); *C08B 3/20* (2013.01); *C09J 7/401* (2018.01); *C09J 7/403* (2018.01); *C09J 7/405* (2018.01); *C09J 2203/334* (2013.01); *C09J 2401/005* (2013.01); *C09J 2401/006* (2013.01); *C09J 2459/005* (2013.01)

(58) Field of Classification Search
CPC ...... D21H 11/18; D21H 19/34; D21H 27/001; D21H 19/20; D21H 25/06; C09J 2401/006; C09J 11/08; C09J 129/04; C09J 2203/334; C09J 2401/005; C09J 2429/00; C09J 2459/005; C09J 7/0228; C09J 7/0232; C09J 7/0235; Y10T 428/2933; Y10T 428/2991; B82Y 30/00; C08B 15/02; C08B 3/20
See application file for complete search history.

(56) References Cited

U.S. PATENT DOCUMENTS

| 8,871,342 B2 * | 10/2014 | Dufour | D21H 19/20 |
| --- | --- | --- | --- |
| | | | 427/358 |
| 9,834,651 B2 * | 12/2017 | Lee | D06M 15/05 |
| 2012/0251818 A1 * | 10/2012 | Axrup | B32B 27/10 |
| | | | 428/326 |
| 2013/0040134 A1 * | 2/2013 | Dufour | D21H 19/20 |
| | | | 428/342 |
| 2013/0273350 A1 * | 10/2013 | Lee | D06M 15/05 |
| | | | 428/326 |
| 2014/0050922 A1 * | 2/2014 | Chin | C09D 101/02 |
| | | | 428/372 |
| 2014/0302336 A1 * | 10/2014 | Heiskanen | C08K 3/34 |
| | | | 428/535 |
| 2015/0368441 A1 * | 12/2015 | Retsina | C08L 1/02 |
| | | | 442/59 |
| 2016/0010279 A1 * | 1/2016 | Hu | D21H 17/07 |
| | | | 136/252 |
| 2016/0017543 A1 * | 1/2016 | Bertrand | D21H 23/56 |
| | | | 162/136 |
| 2016/0097152 A1 * | 4/2016 | Lee | D06M 15/05 |
| | | | 428/326 |
| 2016/0130368 A1 * | 5/2016 | Varma | C08B 11/12 |
| | | | 514/57 |
| 2016/0168696 A1 * | 6/2016 | Missoum | D21H 25/04 |
| | | | 427/299 |
| 2016/0289894 A1 * | 10/2016 | Kajanto | D21C 5/005 |
| 2017/0190799 A1 * | 7/2017 | Rissanen | C08B 15/02 |
| 2017/0204567 A1 * | 7/2017 | Yu | D21H 27/002 |
| 2017/0218145 A1 * | 8/2017 | Lee | D06M 15/05 |
| 2017/0335522 A1 * | 11/2017 | Heiskanen | D21H 27/30 |
| 2017/0342661 A1 * | 11/2017 | Aulin | D21H 19/34 |
| 2018/0010299 A1 * | 1/2018 | Hu | D21H 11/02 |

FOREIGN PATENT DOCUMENTS

| EP | 2551406 A1 | 1/2013 | |
| --- | --- | --- | --- |
| WO | 2005071161 A1 | 8/2005 | |
| WO | 2009147283 A1 | 12/2009 | |
| WO | WO-2009147283 A1 * | 12/2009 | ............. C08J 7/047 |
| WO | 2011104427 A1 | 9/2011 | |

(Continued)

OTHER PUBLICATIONS

International Search Report dated Feb. 13, 2015; International Application No. PCT/FI2014/050528; International Filing Date Jun. 26, 2014 (3 pages).

(Continued)

*Primary Examiner* — Jose A Fortuna
(74) *Attorney, Agent, or Firm* — Cantor Colburn LLP

(57) ABSTRACT

The invention relates to a method for obtaining a release liner and to release liner comprising a primer layer and a cellulose based support layer, the primer layer comprising an organic compound having one or more functional vinylic groups, the organic compound comprising an acetal connecting a first moiety and a second moiety, the first moiety comprising nanofibrillar cellulose having functional hydroxyl groups and the second moiety comprising an organic fragment, the organic fragment comprising at least one functional vinylic group.

21 Claims, 12 Drawing Sheets

(56) References Cited

FOREIGN PATENT DOCUMENTS

| WO | 2013121104 A2 | 8/2013 | | |
|---|---|---|---|---|
| WO | 2013121104 A3 | 8/2013 | | |
| WO | 2013121104 A9 | 8/2013 | | |
| WO | WO-2013160564 A1 * | 10/2013 | ............. | D21H 11/18 |

OTHER PUBLICATIONS

Liimatainen, et al., "Enhancement of the Nanofibrillation of Wood Cellulose Through Sequential Periodate-Chlorite Oxidation", Biomacromolecules 13 (2012) pp. 1592-1597.
Written Opinion dated Feb. 13, 2015; International Application No. PCT/FI2014/050528; International Filing Date Jun. 26, 2014 (5 pages).

\* cited by examiner ative effects, such as tackiness, in end applications. For example, the migration of the silicone to the interface between the primer layer and the top layer may cause problems to the anchorage of the top layer to the primer layer.

The tightness and smoothness level of the primer layer surface have an effect on the amount of the release coating required to form a functional top layer. On cellulose-based support layers, the tightness and/or smoothness level of the support layer surface may be controlled. The tightness of the support layer surface may further be improved by providing a functional primer layer, which may be used to both increase the tightness and smoothness of a substrate layer comprising the support layer and the primer layer, and to improve the anchorage of the top layer to the primer layer.

A primer layer composition comprising nanofibrillar cellulose (NFC) may be used to improve the properties of the release liner. The tightness of the substrate layer surface can be improved by providing a functional primer layer comprising nanofibrillar cellulose. A functional primer layer comprising nanofibrillar cellulose may enable reducing the amount of silicone polymer and platinum catalyst needed to form a release coating. Use of nanofibrillar cellulose (NFC) may enable a surface coverage with reduced amounts of release coating when forming a top layer. For example, a primer layer comprising nanofibrillar cellulose (NFC) may enable a top layer comprising silicone polymer equal to or less than 2 g/m$^2$, such as in the range of 1 to 2 g/m$^2$ or less.

When using nanofibrillar cellulose to obtain release liners, also the amount of carboxymethyl cellulose (CMC) in the primer layer composition may be reduced. Carboxymethyl cellulose is water soluble, unlike nanofibrillar cellulose. Carboxymethyl cellulose has a high viscosity, and is traditionally used as a viscosity modifier in a primer layer. Nanofibrillar cellulose is thixotropic. In comparison to carboxymethyl cellulose, nanofibrillar cellulose may be obtained with even higher viscosity. Nanofibrillar cellulose in a primer layer provides means to control the tightness and smoothness of the primer layer surface. For example, when using nanofibrillar cellulose to increase the surface tightness, the surface porosity may be reduced and the barrier properties of the release liner may be improved.

The primer layer may be further provided with nanofibrillar cellulose comprising selected functionality in the form of functional groups. For example, nanofibrillar cellulose comprising hydroxyl groups may be reacted with other organic molecules to improve the primer layer tightness by covalent bonding. Advances in the fibrillation methods of cellulose have further enabled obtaining fibrillated cellulose having selected properties, such as functional groups in the molecular structure. Primary cellulose may be oxidised to provide nanofibrillar cellulose comprising aldehyde groups.

A primer layer composition may comprise an organic compound connected by an acetal. An acetal may be formed, for example between nanofibrillar cellulose and an organic fragment comprising functional vinylic groups. Preferably, the organic fragment may be an organic molecule, such as an unsaturated aldehyde. Optionally, the organic fragment may be an unsaturated alcohol, such as an unsaturated diol. The organic fragment may optionally contain a water-soluble carrier polymer, such as polyvinyl alcohol, comprising functional vinylic groups. Such primer layer compositions may be used to form a primer layer wherein the anchorage of a silicon polymer based release coating to the primer layer is improved. The amount of vinylic groups in the primer layer may be adjusted by selecting the nanofibrillar cellulose and organic fragments participating in the acetalisation

RELEASE LINER COMPRISING NANOFIBRILLAR CELLULOSE

CROSS-REFERENCE TO RELATED APPLICATIONS

This application is a National Stage application of PCT/FI2014/050528, filed Jun. 26, 2014, which is incorporated by reference herein in its entirety.

FIELD OF THE INVENTION

The invention describes a method for obtaining release liners comprising nanofibrillar cellulose and products thereof.

BACKGROUND

Release liners may in general be used as support material. As a few examples, a release liner may serve as a backing, such as a base layer. In particular, release liners may be used in combination with adhesive facestock and labels, such as printable pressure sensitive adhesive labels. Prior to use of an adhesive label, the release liner may serve as a storage platform for the adhesive label. The release liner may further be used to protect the adhesive side of a facestock.

WO 2005/071161 discloses a support layer comprising cellulose. According to the document, organic molecules are introduced on the primer layer surface as linkers. The organic molecules create a covalent bond with the free hydroxyl groups of the cellulose on the support layer. The other end of the organic molecules has a free vinylic group for reacting with the cross-linking agent of the silicone system.

WO 2009/147283 discloses a release liner having a cellulose fibre-based or polymeric substrate coated with a primer layer comprising a surface treating agent. The surface treating agent may comprise, for example, a grafted PVA having functional side or end groups such as vinylic groups.

WO 2011/104427 discloses a cellulose fibre-based support coated with a primer layer, wherein the primer layer comprises water-soluble polymer having hydroxyl functions, at least some of which have been reacted beforehand with at least one organic molecule that contains at least one vinylic function, wherein said organic molecule also has an aldehyde function.

SUMMARY

Increasing consideration has been given on the development of improved release liners. When the use of release liners continues to grow, innovative solutions provide means to reduce the amount of raw materials needed to obtain functional release liners having consistent quality. A key area for development in release liners relates to the interface between the primer layer and top layer. The primer layer functions as an interface between the support layer and the top layer. Therefore, the primer layer should be compatible with both the support layer and the top layer.

A release coating comprising silicone polymer is typically used to form a release liner top layer. Another issue for development in release liners relates to the anchorage of the top layer to the primer layer, also referred to as "holding" or "rub-off" of the top layer. In spite of the silicone polymer curing, some of the silicone polymer may not be cross-linked in the top layer. During time, the residual non-linked silicone polymer may migrate through the top layer and have reaction(s) and by selecting when the acetalisation reaction(s) take place. For example, nanofibrillar cellulose comprising functional hydroxyl groups may be reacted with an organic molecule having a functional aldehyde group to form an acetal. Alternatively, or in addition, nanofibrillar cellulose oxidised to comprise at least some functional aldehyde groups may be reacted with organic molecules to form an acetal. When the nanofibrillar cellulose comprises functional aldehyde groups and functional hydroxyl groups, the organic molecule may be either an unsaturated aldehyde, which is preferred, or an unsaturated alcohol. The conversion degree of functional hydroxyl groups to functional aldehyde groups in the nanofibrillar cellulose in an oxidative reaction may be controlled. The functional vinylic groups present in the formed primer layer may further be arranged to participate in a cross-linking reaction with the release coating. When the anchorage of a release coating is improved, the amount of silicone polymer used on the release coating may be reduced. When the amount of silicone polymer is reduced, less platinum catalyst is required.

Nanofibrillar cellulose may be used in a method for obtaining a release liner to provide an organic compound comprising a first moiety and a second moiety connected by an acetal, wherein after the acetalisation reaction the first moiety comprises the nanofibrillar cellulose obtained from primary cellulose having functional hydroxyl groups and the second moiety comprises the organic fragment, the organic fragment comprising at least one functional vinylic group. The organic compound may be applied on a surface of a cellulose based support layer to form a release liner primer layer.

Compared to primer layer compositions comprising water soluble polymers, such as polyvinyl alcohol based polymers described in WO 2011/104427, nanofibrillar cellulose as a non-water soluble and thixotropic material may be used to provide a primer layer, which does not penetrate deep into a cellulose based support layer, but rather forms a sealing surface. Furthermore, the particle dimensions of nanofibrillar cellulose promote acetalisation reactions on the surface of the fiber bundles. Reactions occurring primarily on the surface enable reduced amounts of organic molecules comprising functional vinylic groups to be used, to provide functional vinylic groups capable of participating in further cross-linking reactions with the release coating. Functional hydroxyl groups of the nanofibrillar cellulose have similar repeat units to primary cellulose, which further promotes compatibility of nanofibrillar cellulose with a cellulose based support layer. In addition, functional aldehyde groups in nanofibrillar cellulose promote covalent boding of the nanofibrillar cellulose with the cellulose based support layer.

Objects and embodiments of the invention are further described in the independent and dependent claims.

DETAILED DESCRIPTION

Adhesive labels, such as self-adhesive labels, may be used on various articles, such as containers, packages or bottles made of different materials such as natural fibers, glass, plastic, metal or composites. Adhesive labels are widely used on home and personal care products, industrial chemical products, pharmaceutical and health care products, tyres, beverage and wine bottles, to name a few examples.

Adhesive labels, which may also be referred to as label laminates or labelstock, comprise at least a facestock. A facestock may also be referred to as a face material layer, a face layer or a face film. In addition, adhesive label typically comprise an adhesive layer, which may be adjoined to a release liner.

When used on adhesive labels, a release liner protects the adhesive layer of the label. The release liner also allows efficient handling of the label up to the point where the label is dispensed from the liner and adhered on an article surface.

Release Liner

A release liners for adhesive labels typically comprise a support layer and a primer layer applied on the support layer. The support layer of the release liner may be cellulose based or polymer based, depending of the end user preferences. The support layer of the release liner may be cellulose based. The support layer of the release liner may be polymer based. The primer layer may comprise a carrier polymer and filler compounds. The combination of a support layer coated with a primer layer may be referred to as a substrate layer. A release liner may further comprise a top layer adjoined to the primer layer. The top layer may comprise a release coating, which may be used to provide dehesive properties on the release liner surface for labelling purposes. In other words, the top layer may be used to provide properties improving the release of an adhesive from the release liner surface. The structure of a release liner may further comprise other structural properties or compositions, which enable the labels to be used in dedicated end applications.

Figure 1:
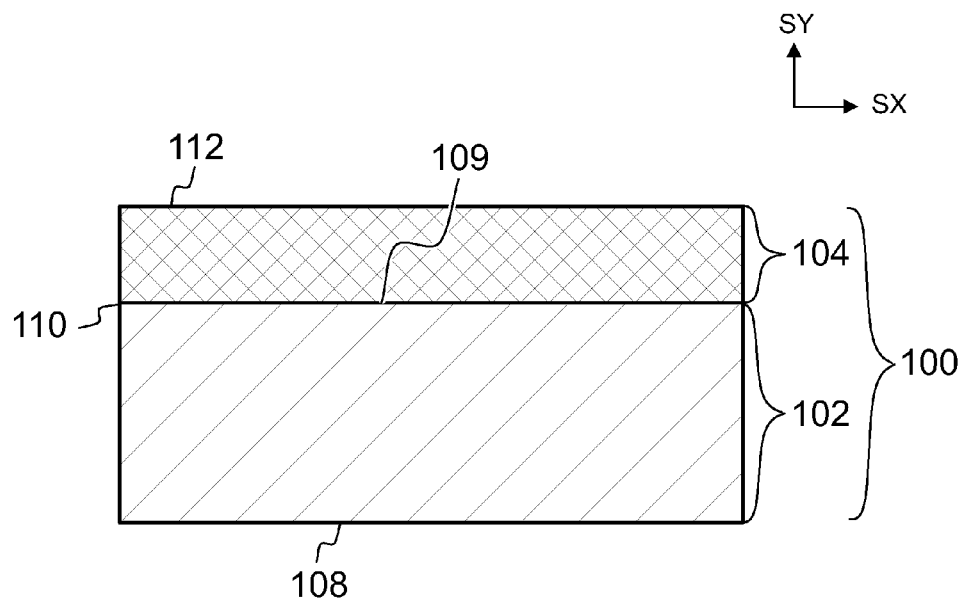
FIG. 1 illustrates, by way of an example, a release liner structure comprising a substrate layer.

FIG. 1, illustrates, by way of an example, a release liner for adhesive labels comprising a substrate layer 100. The substrate layer 100 typically comprises a support layer 102 and may comprise a primer layer 104. When a mixture used to form a primer layer 104 is applied on a surface 109, 108 of the support layer 102, a first interface 110 is formed. The first interface 110 connects the support layer 102 to the primer layer 104. The mixture may be applied on the front surface 109, on the bottom surface 108, or on both sides of the support layer 102. The mixture may be applied on at least one surface of the support layer 102 by any suitable means. Suitable means for applying the mixture on a surface 109, 108 may comprise a surface coating application process such as size-press, metering size-press, foulard coating, rod coating, bar coating, air-knife coating, gravure coating, blade coating, single and multilayer curtain coating, reverse roll coating, spray coating, atomisation coating, liquid application system (LAS) coating, kiss coating or foam coating, to name a few.

Figure 2:
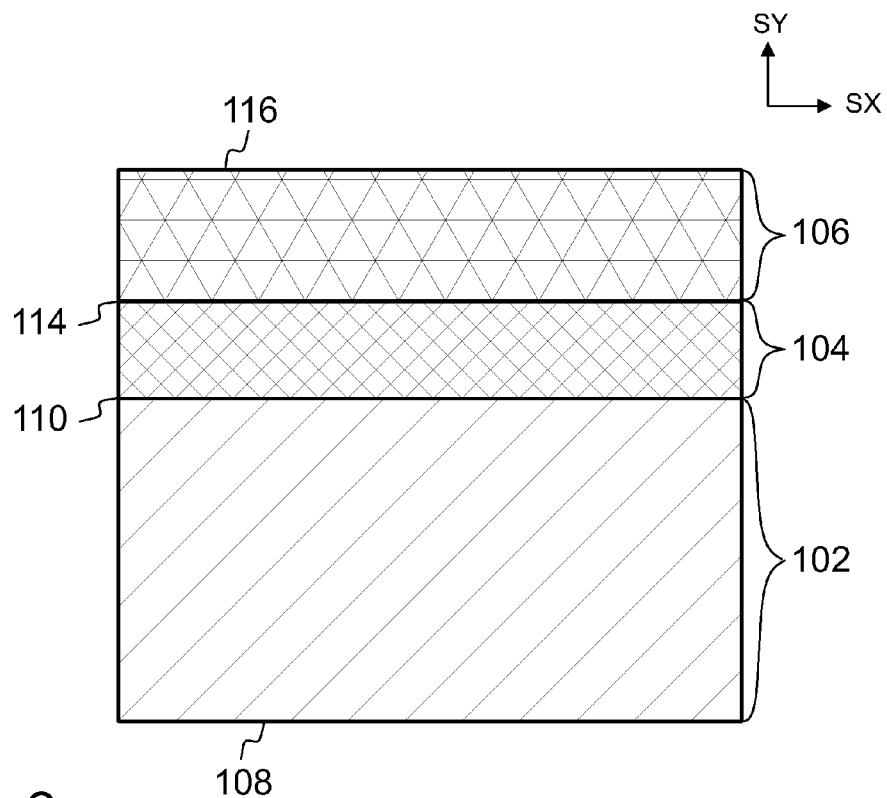
FIG. 2 illustrates, by way of an example, a release liner comprising a support layer, a primer layer and a top layer.

FIG. 2, illustrates, by way of an example, a release liner comprising at least one top layer. The top layer 106 may be formed by applying a release coating on a surface 112 of the primer layer 104. When a release coating forming a top layer 106 is applied on a surface 112 of the primer layer 104, a second interface 114 is formed. The second interface 114 connects the primer layer 104 to the top layer 106. The top layer 106 may be applied on one or more primer layer 104 surfaces by any suitable means. Suitable means for applying the a release coating on a surface 112 of the primer layer 104 may comprise for example means as described above for applying the mixture. An adhesive layer of facestock may be adjoined to a top surface 116 of the release liner comprising a top layer 106.

In this application, a release liner comprising a cellulose based support layer is preferred. The cellulose based support layer may be for example paper, consisting essentially of cellulosic material. Cellulosic material in general comprises a polymer structure of β(1→4) linked D-glucopyranose units. Hydroxyl groups in the glucopyranose units participate in forming hydrogen bonds, holding individual cellulose chains firmly together. When using a cellulose based material as a support layer of a substrate layer, the support layer may be treated to obtain a primer layer having better surface smoothness and tightness. The substrate layer surface smoothness and tightness refer to the porosity level of the substrate layer surface, determinable by a number of methods, for example by using a mercury porosimeter in a conventional mercury displacement method for papers.

Examples of paper types typically used as a release liner support layer are coated papers, vegetable parchment, glassine and greaseproof paper. Typical examples of coated papers used as a release liner support layer are Super Calandered Kraft paper (SCK) and glassine. Glassine in general refers to paper made of chemical pulp, typically having a coat weight (grammage) in the range of 50 to 150 g/m². Glassine paper has a good transparency level; for example a 60 g/m² glassine paper typically has a transparency level of at least 45, when measured with visible light (ISO 2469:1994).

Other examples for coated papers used as a release liner support layer are Clay Coated Kraft paper (CCK), Machine Finished Kraft paper (MFK) and Machine Glazed paper (MG). Preferably, when using a functional primer layer, coated papers having a grammage equal to or more than 38 g/m² are used, for example in the range of 38 to 150 g/m².

Top Layer

A top layer refers to a release coating applied on a surface of the primer layer. The release coating may be silicone polymer based. Silicone polymers are used in a release coating in the top layer to provide stable release properties for an adhesive laminate. When an adhesive is released, a stable and flat release profile is desired. Stable release profile refers to smooth release and low adhesive interaction. A flat release profile refers to the amount of release force required for detaching an adhesive from the top layer surface, which should be kept as small as possible, regardless of the delamination speed.

When forming a release coating on the primer layer surface, different types of silicone polymers can be used. The silicone polymers can be, for example, end-blocked or multi-functional polymers, such as pendant or branched. The silicone polymers typically comprise different amounts of vinylic groups in the polymer structure. The vinylic groups in the silicone polymer structure have a functional purpose. When a release coating has been applied on a primer layer surface, the vinylic groups may be cross-linked. Silicone polymers may be divided into two categories depending of the cross-linking method used. The cross-linking reaction of vinylic groups in the polymer structure may be initiated either by radiation or by thermal activation. The radiation may be provided by ultraviolet light or electron beams. However, the thermal cross-linking of silicone polymers has obtained wider use in the industry. The thermal activation may be provided by a kiln, wherein the release coating on the primer layer surface reaches a temperature where the cross-linking reaction of vinylic groups takes place. Recent development has aimed to provide silicone polymers enabling cross-linking reaction at a temperature in the range of 60° C. to 100° C., referred to as low temperature curing (LTC) silicones.

The silicone polymer cross-linking reaction may also be referred to as curing. The amounts of vinylic groups in the silicone polymer structure correlates to the curing time, which refers to the time period of cross-linking vinylic groups available within the silicone polymer structure into a network of cured silicon polymer. Depending of the used method, the curing may be for example an addition curing, a peroxide curing or an condensation curing. An addition curing using a cross-linker and a platinum catalyst may be used, for example, when reduced curing time for cross-linking the silicone polymer and high speed in release liner manufacturing are preferred. In an addition curing, Si—H groups are attached to the double bonds of the vinylic groups, thus forming covalent bonds. The cross-linking reaction leads to a formation of a network of cured silicon polymer. The cross-linked network of polymeric silicon material forms a top layer. The amount of platinum catalyst used in curing the silicone polymer is of importance, as the platinum material used in the catalyst is expensive. When using silicone based release coatings, it is preferred to reduce the platinum levels used in the curing of the silicone polymer.

Primer Layer

A key area for development in release liners relates to the interface between the primer layer and top layer. Cross-linkable silicone polymers comprising functional vinylic groups are used in a release coating to form a top layer. One function of the primer layer is to promote the anchorage of the substrate layer to the top layer.

When using a cellulose based support layer, at least one side of the support layer is typically coated with a primer layer. A primer layer functions as an interface between the support layer and the top layer. The primer layer may be used to improve the mechanical properties of the substrate layer, such as strength or surface tightness. When the support layer is a cellulose based support layer, one function of the primer layer is to provide a more closed or sealed structure on the substrate layer surface, the substrate layer comprising the support layer and the primer layer. Cellulose based substrate layer surface comprises a lattice of cellulose fibrils and voids between the fibrils. The total volume of the voids refers to surface porosity. Reduced surface porosity improves the substrate layer tightness. Surface tightness provides barrier properties to a cellulose based substrate layer. A tight surface further provides means for reducing the amounts of release coating needed to obtain a functional top layer. Means for reducing surface porosity comprise a calendaring treatment. Calendering may be used to improve surface smoothness. A support layer can be calendered prior to applying a primer layer mixture. Alternatively, a substrate layer can be calendered after applying a primer layer mixture on a support layer. The calender may be a multi-nip calender or a supercalender.

The compatibility of the primer layer with the support layer or the top layer may be improved by the primer layer composition. The primer layer may comprise pigments and binder material. Examples of primer layer pigments are inorganic minerals such as clay and calcium carbonate. Examples of primer layer binder material are water-soluble organic polymers such as starch, latex or polyvinyl alcohol or water-soluble carboxymethyl cellulose. A primer layer compatibility with the support layer may be improved, for example by providing a primer layer mixture capable to form hydrogen bonds with the support layer. For example, a release liner comprising a cellulose based support layer and a primer layer typically comprises a carrier polymer having functional hydroxyl groups on the surface of the primer layer. On a cellulose based support layer, the functional hydroxyl groups of the carrier polymer may participate in forming hydrogen bonds with the cellulose based support layer. The hydrogen bonding between the primer layer and the support layer improves the attachment of the two layers and may increase the strength of the substrate layer.

A preferred primer layer binder material is polyvinyl alcohol (PVA), which has excellent film forming capabilities and is resistant to many solvents. Polyvinyl alcohol is a water-soluble synthetic polymer having functional hydroxyl groups. Polyvinyl alcohol further improves the sealing of the substrate layer surface, thereby decreasing the substrate layer porosity. When dried, polyvinyl alcohol has good water resistance properties. Polyvinyl alcohol is also chemically inert to platinum catalyst systems used for curing silicone based release coatings. Polyvinyl alcohol may further be grafted to comprise functional groups. The functional hydroxyl groups of the polyvinyl alcohol may be further modified to comprise other functional groups, for example in chemical reactions with organic molecules.

Another preferred primer layer binder material is carboxymethyl cellulose (CMC). Carboxymethyl cellulose is a water-soluble cellulose derivative, wherein some of the hydroxyl groups (—OH) of the glucopyranose monomers have been converted to carboxymethyl groups (—$CH_2$—COOH). Carboxymethyl cellulose has a high viscosity, and is traditionally used as a viscosity modifier in a primer layer.

Up to 35% by weight of the primer layer composition may consist of binder material. A mixture for coating a cellulose based support layer in general comprises water-soluble binders capable of forming a film, such as starch, polyvinyl alcohol (PVA) and carboxymethyl cellulose (CMC).

Nanofibrillar cellulose may be used to replace at least some of the binder material, in particular carboxymethyl cellulose, in the primer layer composition. When replacing the binder material with nanofibrillar cellulose to at least some extent, the nanofibrillar cellulose may provide properties improving the functionality of the primer layer. Nanofibrillar cellulose may further be arranged to comprise functional groups. The method of obtaining nanofibrillar cellulose may be selected to provide desired functional groups to the nanofibrillar cellulose. For example, the functional groups may be selected to improve the anchorage and/or cross-linking of the silicone polymer to the primer layer.

In comparison to carboxymethyl cellulose, nanofibrillar cellulose does not dissolve to elementary fibrils in water, and may be obtained with even higher viscosity. Nanofibrillar cellulose is thixotropic; the viscosity of nanofibrillar cellulose in a mixture may be controlled by shear force; increases in shear force provides means to control the viscosity of the mixture. Nanofibrillar cellulose gels are also highly shear thinning. When subjected to a shear force, the viscosity of a nanofibrillar cellulose mixture is decreased. This shear-thinning behaviour is particularly useful in a coating application. For example, when applying a mixture comprising nanofibrillar cellulose on a surface of the cellulose based support layer, the thixotropic properties of nanofibrillar cellulose may be used in forming the primer layer. Nanofibrillar cellulose as a non-water soluble and thixotropic material may be used to provide a primer layer, which does not penetrate deep into a cellulose based support layer, but rather forms a sealing surface. Furthermore, the particle dimensions of nanofibrillar cellulose promote acetalisation reactions on the surface of the fiber bundles. Reactions occurring on the surface enable reduced amounts of organic molecules comprising functional vinylic groups to be used, to provide functional vinylic groups capable of participating in further cross-linking reactions in the release coating. Functional hydroxyl groups of the nanofibrillar cellulose have similar repeat units to primary cellulose, which promote compatibility of the nanofibrillar cellulose with the cellulose based support layer. Functional aldehyde groups in nanofibrillar cellulose further promote covalent boding of the nanofibrillar cellulose with the cellulose based support layer. Nanofibrillar cellulose in a primer layer provides means to control the tightness and smoothness of the primer layer surface.

Nanofibrillar cellulose comprises improved film-forming properties in comparison to CMC or water-soluble carrier polymers, such as polyvinyl alcohol, and may improve the sealing properties of the primer layer when applied on a cellulose based support layer. Therefore, nanofibrillar cellulose enables a more closed structure of the primer layer. Furthermore, the relative short fiber dimensions of nanofibrillar cellulose enable surface coating application processes, where primary cellulose may not be used. For example, whereas primary cellulose having relative long fiber length easily clogs the coating device, dispersions comprising nanofibrillar cellulose may be used to provide a thin and smooth size layer, by spreading the organic compound or a mixture comprising the organic compound on a support layer surface.

Nanofibrillar Cellulose

Nanofibrillar cellulose (NFC) in this context refers to collection of isolated cellulose nanofibrils or nanofibril bundles derived from cellulose based fibre material, referred to as primary cellulose. Cellulose is a renewable natural polymer, existing as fiber material in many plants. Cellulose may be obtained from various organic natural raw material sources comprising cellulose. Nanofibrillar cellulose in general has a high aspect ratio (length/diameter). When measured from a group of at least 20 isolated cellulose nanofibrils, for example by means of image analysis, the group of isolated cellulose nanofibrils may comprise a number-averaged length equal to or more than one micrometer, and a number-averaged diameter equal to or less than 400 nm. Preferably, the group of isolated cellulose nanofibrils may comprise a number-averaged diameter equal to or less than 200 nm. Most preferably, the group of isolated cellulose nanofibrils may comprise a number-averaged diameter equal to or less than 100 nm. Nanofibrillar cellulose may further comprise elementary fibrils, typically in the range of 2 to 12 nm in diameter. The dimensions of the nanofibrils or nanofibril bundles may vary depending on the cellulose based fibre material and disintegration method used to provide the nanofibrillar cellulose. Nanofibrillar cellulose may also contain small amounts of other wood components, such as hemicellulose or lignin, wherein the amount of the hemicellulose or lignin is dependent on the plant source. Nanofibrillar cellulose is characterized by a large specific surface area and a strong ability to form hydrogen bonds. In water dispersion, nanofibrillar cellulose typically appears as either light or almost colourless gel-like material. Nanofibrillar cellulose may also be referred to as cellulose nanofibrils, nanocellulose or microfibrillated cellulose (MFC).

The nanofibrillar cellulose is preferably made of plant material. One alternative is to obtain the nanofibrils from non-parenchymal plant material where the nanofibrils are obtained from secondary cell walls. One abundant source of cellulose nanofibrils is wood fibres. The wood fibres may be of softwood or hardwood. The wood fibres may comprise mechanically treated and/or chemically treated fibers and/or fiber-like particles. Cellulose may be obtained, for example, by a mechanical pulping process. The mechanical pulping process could be preceded by a chemical pretreatment, producing chemimechanical pulp. Mechanically treated wood fibers may comprise, among other things, wood flour, saw dust, chip material, and/or mechanical pulp such as TMP (thermo mechanical pulp), GW (groundwood pulp)/SGW (stone groundwood pulp), PGW (pressure groundwood pulp), RMP (refiner mechanical pulp), and/or CTMP (chemithermomechanical pulp). The chemically treated wood fibers preferably comprises chemical pulp. The chemical pulp may be, for example, from kraft process or sulfite process, but also other chemical processes may be used, such as a soda pulping process. Preferably, the chemical pulp is from the kraft process.

The nanofibrillated cellulose is manufactured by homogenizing wood-derived fibrous raw material, which may be chemical pulp. The fibrillation method of cellulose typically comprises mechanical means of disintegrating primary cellulose to obtain nanofibrillar cellulose. Mechanical means of disintegrating cellulose may comprise disintegration with a suitable equipment such as a refiner, grinder, homogenizer, colloider, friction grinder, ultrasound sonicator, fluidizer such as microfluidizer, macrofluidizer or fluidizer-type homogenizer. The disintegration by mechanical means as described above produces nanofibrils which typically have a diameter of only some nanometers, which is 50 nm at the most and gives a clear dispersion in water. The nanofibrils can be reduced to size where the diameter of most of the fibrils is in the range of 2 to 20 nm. The fibrils originating in secondary cell walls are essentially crystalline with degree of crystallinity of at least 55%.

Primary cellulose, such as cellulose in the form of chemical pulp, can be labilized by oxidation before the disintegration to nanofibrils. An oxidative treatment may be used to provide primary cellulose derivatives having selected properties, such as functional groups in the molecular structure. The nanofibrillar cellulose obtained from primary cellulose may contain some modified functional groups when compared to the chemical structure of a natural cellulose. Such modified groups can be, for example, aldehyde and/or carboxyl groups. Nanofibrillar cellulose containing modified functional groups may be obtained e.g. by fibrillation of oxidised (N-oxyl mediated or periodate treated) cellulose pulp. The oxidation can be performed also during, or after fibrillation, or in any combination of these.

Figure 3:
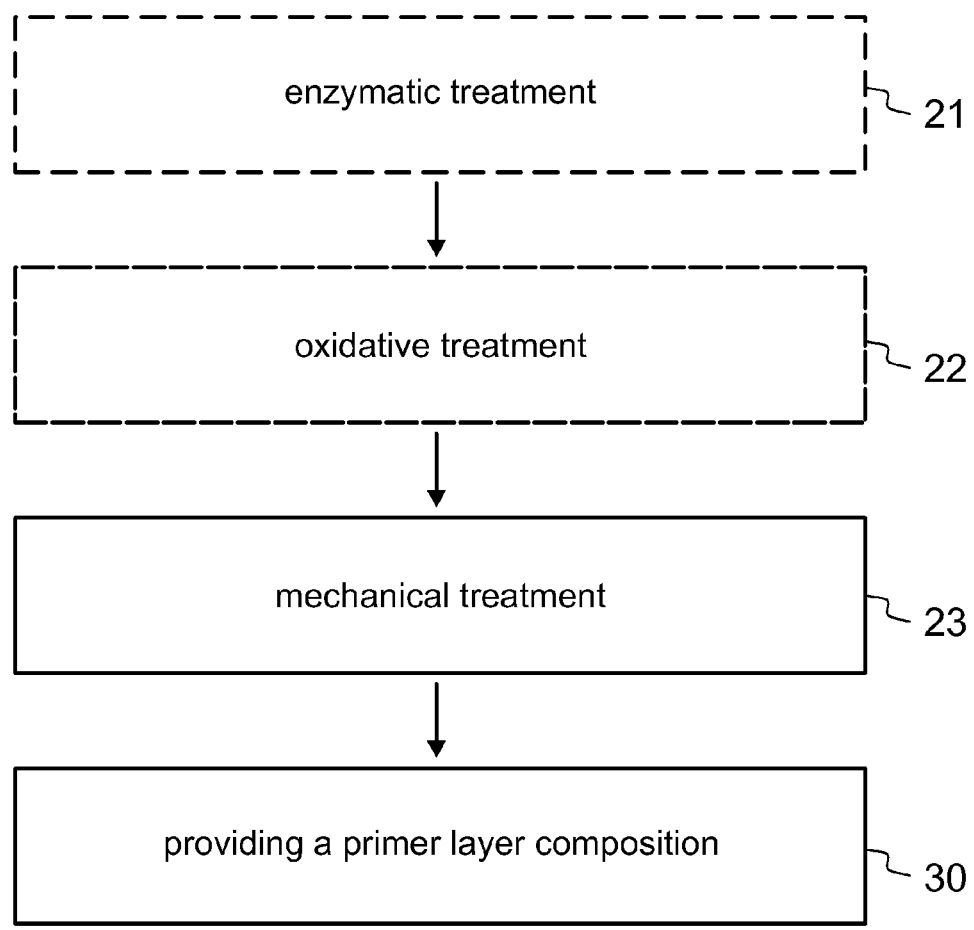
FIG. 3 illustrates, by way of an example, a method to obtain nanofibrillar cellulose.

FIG. 3 illustrates, by way of an example, a method to obtain nanofibrillar cellulose. In the method, primary cellulose is subjected to mechanical treatment to obtain nanofibrillar cellulose. In the mechanical treatment 23, the primary cellulose is disintegrated by mechanical means to obtain nanofibrillar cellulose. The obtained nanofibrillar cellulose may be used in a mixture, which may be applied on a support layer surface to provide a primer layer. The primary cellulose or the nanofibrillar cellulose can optionally be subjected to an oxidative treatment 22. The oxidative treatment 22 may be arranged either before or after the mechanical treatment 23. The treatment of the primary cellulose may comprise an optional enzymatic treatment 21. The enzymatic treatment 21 can precede the mechanical treatment 23 or the oxidative treatment 22. In the enzymatic treatment 21, enzymatic hydrolysis can be used to detach fibre bundles of the primary cellulose. In the oxidative treatment 22, the structure of the primary cellulose is modified by a chemical reaction to obtain functional groups, such as functional aldehyde groups and/or functional carboxyl groups. The functional groups obtained by oxidation of the primary cellulose may participate in further chemical reactions. The functional groups obtained by oxidation, such as carboxyl groups in particular, also facilitate disintegration of the cellulose when forming nanofibrillar cellulose in a mechanical treatment 23.

Modification of Cellulose

The primary cellulose may be processed further by chemical and/or mechanical treatments. By chemical derivatization the properties of the primary cellulose can be altered in comparison to the chemical structure of a natural cellulose, while retaining the polymeric structure. Reaction selectivity is important so that a derivative of desired chemical structure could be obtained.

A single β(1→4) linked D-glucopyranose unit of a natural polymeric cellulose comprises six carbon atoms. The carbon atoms of the D-glucopyranose unit are typically denoted by their position as C1 to C6 carbons. Of these six carbon atoms the C2, C3 and C6 positions comprise hydroxyl groups available for the derivatization of primary cellulose. In particular, the hydroxyl groups of primary cellulose can be arranged to react with oxidising compounds to obtain oxidised cellulose derivatives. Derivatization of the primary cellulose may be arranged, for example, through oxidising at least some hydroxyl groups in the primary cellulose to comprise a functional aldehyde group on C-6, C-2 or C-3 position. The oxidation of primary cellulose refers to the oxidation of the hydroxyl groups to aldehydes and/or carboxyl groups. The oxidation proceeds through a conversion of hydroxyl groups to aldehyde groups. The aldehyde groups may further be oxidized to carboxyl groups, to complete the oxidation. Depending of the type of chemical reaction used, different chemical derivatives of cellulose may be obtained. Aldehyde groups have a tendency of causing yellowing of cellulosic fibers over time, hence the presence of aldehyde groups in a paper product have not been generally preferred.

Figure 4:
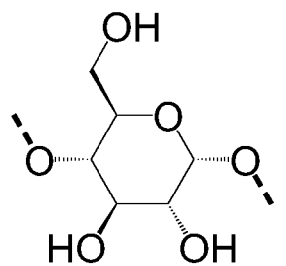
FIG. 4 illustrates, by way of an example, a schematic reaction for the oxidation of C-6 hydroxyl group of primary cellulose into functional aldehyde group and further into functional carboxyl groups.
Figure 4:
Figure 4:
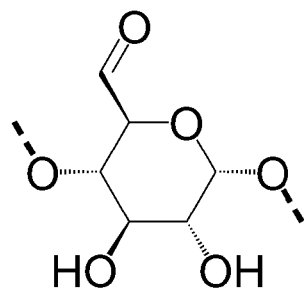
Figure 4:
Figure 4:
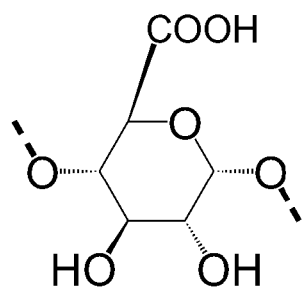

A catalytic nitroxyl-mediated (such as "TEMPO"-mediated) oxidation of hydroxyl groups of the primary cellulose provides a method for effectively and selectively oxidizing hydroxyl groups of primary cellulose. In a "TEMPO"-mediated oxidation, the C-6 primary hydroxyl groups of primary cellulose are oxidized catalytically by a heterocyclic nitroxyl compound, referred to as 2,2,6,6-tetramethylpiperidinyl-1-oxy free radical, "TEMPO". In a "TEMPO"-mediated oxidation, the main oxidant is hypochlorite. FIG. 4 is an example showing the oxidation of a C-6 hydroxyl groups of primary cellulose to a functional aldehyde group and further into a functional carboxyl group.

Figure 5:
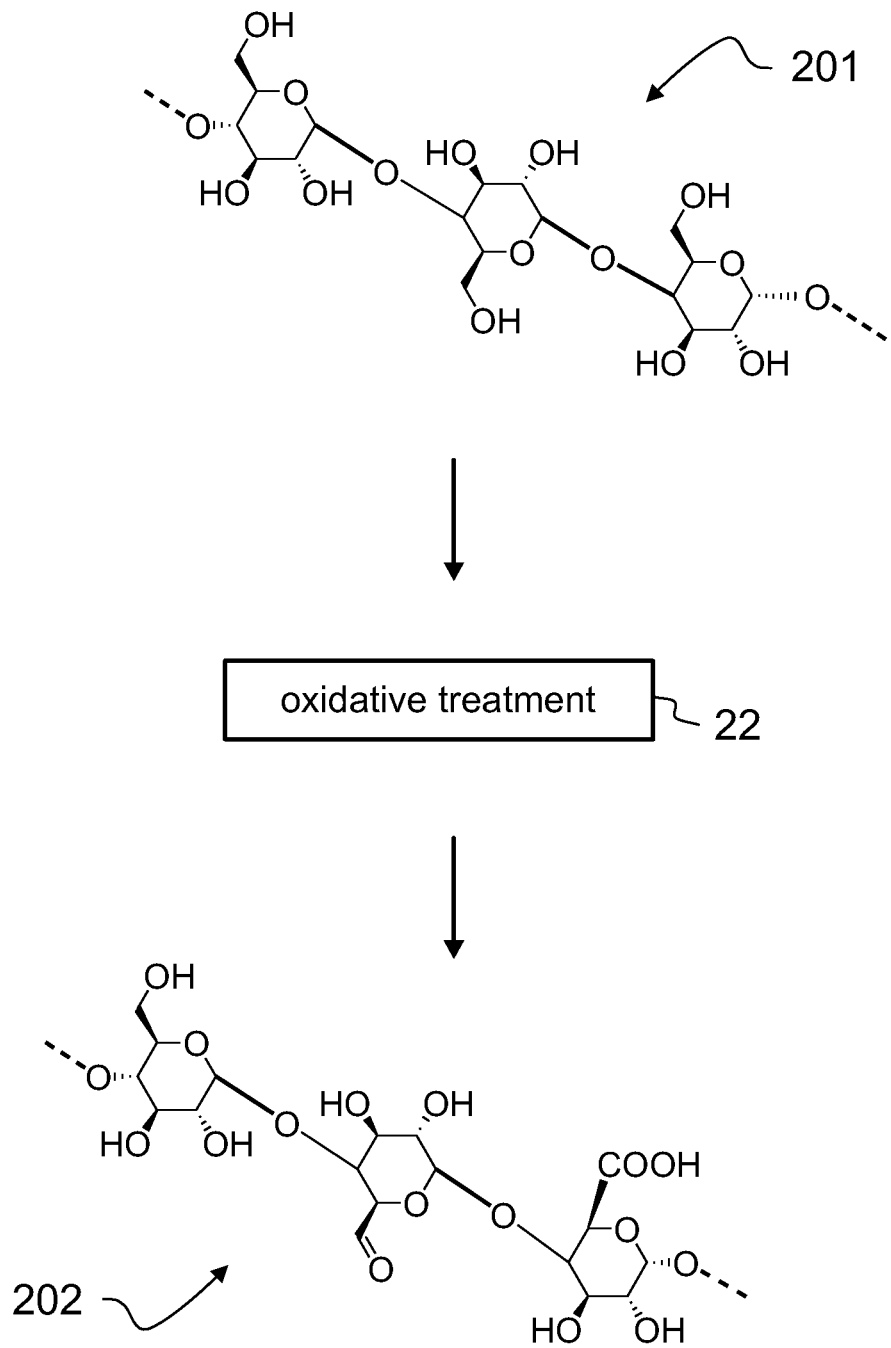
FIG. 5 illustrates, by way of an example, a schematic nitroxyl-mediated oxidative treatment, wherein C-6 hydroxyl groups in primary cellulose are selectively oxidised into aldehyde and carboxyl groups.

FIG. 5, illustrates, by way of an example, a nitroxyl-mediated oxidative treatment, wherein C-6 hydroxyl groups in a primary cellulose are selectively oxidised into aldehyde and carboxyl groups. A primary cellulose 201 comprising functional hydroxyl groups may be subjected to an oxidative treatment 22, providing an oxidised cellulose 202 comprising functional hydroxyl groups (OH), functional aldehyde groups (CHO), functional carboxyl groups (COOH) or any combination of these. The oxidation process may be controlled by adjusting the amount of unreacted catalyst and the pH of the medium. The reaction proceeds rapidly and produces also aldehyde groups. The dosage of hypochlorite to cellulose can be 1.7 to 5 mmol/g pulp, preferably 2.2-2.7 mmol/g pulp. The pH is preferably between 8.0 and 9.0, these values included, but a wider range, from 6 to 10, may also be used. The temperature can be between 20 and 50° C. With the above-mentioned ranges, a conversion in the range of 0.5-1.4 mmol COOH/g pulp, preferably 0.6-1.1 mmol COOH/g pulp, most preferably 0.7-0.9 mmol COOH/g pulp may be achieved. In particular, activation with chlorine dioxide ($ClO_2$) may be used to improve the oxidation selectivity. According to another embodiment, the primary cellulose may be oxidized by using hypochlorite as the main oxidant and tertiary amine as a cocatalyst. Other heterocyclic nitroxyl compounds known to have selectivity in the oxidation of the hydroxyl groups of C-6 carbon of the glucose units of the cellulose may also be used. After a desired conversion degree of hydroxyl groups to aldehyde and carboxyl groups has been reached by using these reagents, the reaction can be stopped and the oxidised cellulose may be treated further. Conditions suitable for obtaining nanofibrillar cellulose through catalytic nitroxyl-mediated (such as "TEMPO"-mediated) oxidation have further been described, for example, in the Finnish patent application number 20126306.

An advantage of nanofibrillar cellulose is, that functional groups such as aldehyde and carboxyl groups can be formed already by a catalytic nitroxyl-mediated oxidation treatment of cellulose, which functional groups will therefore be present when mechanically disintegrating the chemically treated cellulose to nanofibrillated cellulose. The method of providing nanofibrillar cellulose using a catalytic nitroxyl-mediated oxidation treatment therefore inherently provides a method of obtaining selectively chosen functional groups.

Figure 6:
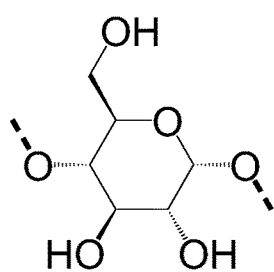
FIG. 6 illustrates, by way of an example, a schematic periodate treatment for selectively oxidising cellulose hydroxyl groups in primary cellulose into aldehyde and carboxyl groups.
Figure 6:
Figure 6:
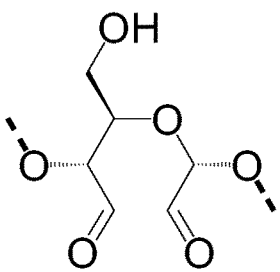
Figure 6:
Figure 6:
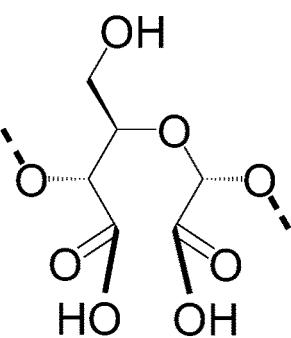

While FIG. 5 shows, by way of an example, a selectivity to the C-6 hydroxyl groups of primary cellulose, other functional hydroxyl groups of primary cellulose may also be oxidised. FIG. 6 illustrates, by way of an example, a general reaction route for a periodate treatment for selectively oxidising hydroxyl groups in a primary cellulose into aldehyde and carboxyl groups. At least some of the vicinal diols in the primary cellulose may be oxidised to comprise a dialdehyde by a periodate treatment. A vicinal diol in this context refers to the two hydroxyl groups occupying vicinal positions. In other words, vicinal diols are attached to adjacent atoms, such as the C-2 and C-3 carbons of the D-glucopyranose unit. Selective oxidation of primary cellulose to a 2,3-dialdehyde cellulose (DAC) may be obtained by using for example sodium periodate and chlorite, which simultaneously break the carbon-carbon bond of the glucopyranose ring and oxidise the C-2 and C-3 hydroxyl groups to aldehyde groups. The aldehyde groups may further be selectively oxidised to 2,3-dicarboxylic acid cellulose (DCC). Conditions suitable for obtaining nanofibrillar cellulose through sequential periodate—chlorite treatment have been further described, for example, in Biomacromolecules 13 (2012) 1592-1597 (H. Liimatainen et al., Enhancement of the nanofibrillation of wood cellulose through sequential periodate-chloride oxidation).

Oxidation of primary cellulose may be used to convert one or more hydroxyl groups in a cellulose glucopyranose unit to aldehyde groups and carboxyl groups. The oxidation process may be controlled or reversed. A reduction of the carboxyl groups to aldehyde groups is possible. A further reduction of the aldehyde groups to hydroxyl groups is also possible.

The amount of functional hydroxyl groups converted to functional aldehyde groups in a nitroxyl-mediated oxidative treatment, wherein C-6 hydroxyl groups in primary cellulose are selectively oxidised, may be at least 0.02 mmol/g, preferably at least 0.05 mmol/g. A conversion degree of functional hydroxyl groups to functional aldehyde groups may be equal to or less than 0.5 mmol/g, such as in the range of 0.02 to 0.5 mmol/g, for example in the range of 0.05 to 0.25 mmol/g.

The amount of functional hydroxyl groups converted to functional aldehyde groups in a periodate treatment, wherein the C-2 and C-3 hydroxyl groups in primary cellulose are selectively oxidised, may be at least 0.05 mmol/g, preferably at least 0.1 mmol/g, most preferably at least 0.3 mmol/g. A conversion degree of functional hydroxyl groups to functional aldehyde groups may be equal to or less than 6 mmol/g, such as in the range of 0.1 to 6.0 mmol/g, for example in the range of 0.3 to 4.0 mmol/g.

A high conversion degree of functional hydroxyl groups to functional aldehyde groups is preferred, when acetalising oxidised cellulose or nanofibrillar cellulose with an organic molecule or a carrier polymer having functional hydroxyl groups available.

Disintegration of Oxidised Cellulose to Nanofibrillar Cellulose

Primary cellulose may be disintegrated to nanofibrillar cellulose by mechanical means. When providing nanofibrillar cellulose, the process may comprise oxidation of the primary cellulose before or after disintegrating the primary cellulose. Alternatively, the process may comprise oxidation of nanofibrillar cellulose obtained from primary cellulose. Primary cellulose derived from plants, especially wood, is typically in fiber form. Compared to fibers of primary cellulose, fibers of oxidised cellulose are easier to disintegrate by mechanical methods to small-scaled fragments, i.e. to nanofibrillar cellulose (NFC). An oxidised cellulose derivative comprising functional carboxyl groups increases the anionic charge density of cellulose surfaces. Functional carboxyl groups reduce the hydrogen bonding of the cellulose. An oxidised cellulose derivative having reduced hydrogen bonding between nanofibris or nanofibril bundles requires less energy for mechanical disintegration. TEMPO-mediated selective catalytic oxidation or selective periodate treatment, as examples, may be used to convert primary hydroxyl groups into aldehyde and carboxyl groups.

When making nanofibrillar cellulose from oxidised cellulose, it has been found that the presence of carboxyl groups in the oxidised cellulose reduces the amount of mechanical energy used in fibrillating cellulose to nanofibrillar size. In particular, according to an embodiment a carboxyl group oxidation level (conversion degree) in the cellulose in the range of 0.5-1.0 mmol COOH/g pulp, preferably in the range of 0.6-0.95 and most preferably in the range of 0.7-0.9 is already sufficient to provide oxidised cellulose fibers, which can be easily disintegrated to fibrils by mechanical means.

Oxidized cellulose derived from cellulose raw material may be disintegrated to nanofibrillar size, referred to as nanofibrillar cellulose (NFC). The dimensions of the fibrils or fibril bundles are dependent on raw material and disintegration method. The nanofibrillar cellulose may also contain some hemicelluloses; the amount is dependent on the plant source. Mechanical disintegration of the oxidised cellulose is carried out with suitable equipment as described above, such as a refiner, grinder, homogenizer, colloider, friction grinder, ultrasound sonicator, fluidizer such as microfluidizer, microfluidizer or fluidizer-type homogenizer. Before disintegrating the oxidized pulp to provide nanofibrillar cellulose, the pH of the medium may be adjusted to 7-10, preferably 7-9, and most preferably to 7-8.5, to lower the energy needed for disintegration further.

The nanofibrillar cellulose (NFC) prepared from oxidised cellulose by above-mentioned methods has excellent gelling ability, which means that it forms a gel at a low consistency in aqueous medium. When the oxidized pulp is ground at a consistency of about 1 to 4% by weight in aqueous medium, a clear gel comprising nanofibrillar cellulose in water (NFC gel) is obtained.

Acetalisation of Nanofibrillar Cellulose with Organic Fragments

A release liner comprising a primer layer comprising nanofibrillar cellulose (NFC) may be used to improve the properties of the release liner. The nanofibrillar cellulose (NFC) comprises functional hydroxyl groups, and may be used to replace carboxymethylated cellulose in the primer layer. The nanofibrillar cellulose (NFC) further may be used to increase the specific surface area of the primer layer.

Nanofibrillar cellulose may be arranged to react with one or more organic fragments in an acetalisation reaction to provide an organic compound comprising an acetal.

In this application, an organic compound refers to a chemical compound consisting of at least two moieties, of which at least one is an organic fragment and one is nanofibrillar cellulose. A moiety refers to a part of the organic compound separated by a chemical bond. The chemical bond between the moieties is a functional group formed in a chemical reaction, in particular an acetal. An organic fragment refers to a molecular structure containing an organic molecule, an organic polymer or a combination of these. An organic fragment may comprise one or more organic molecules. An organic molecule is a groups of atoms connected by chemical bonds. An organic molecule has a defined chemical structure, such as number or atoms. An organic polymer is a macromolecule composed of many repeated subunits, known as monomers. An organic polymer may be formed of monomers in a polymerization reaction. An example of an organic polymer is a water-soluble carrier polymer, such as polyvinyl alcohol. Organic molecules may comprise a linear or branched, saturated or unsaturated hydrocarbon chain having 2 to 20 carbon atoms, optionally interrupted by heteroatoms of N, O, or S. Organic molecules comprise at least one functional vinylic group. Organic molecules may further comprise at least one functional aldehyde group or at least one functional hydroxyl group. Organic molecules may be, for example unsaturated aldehydes having a general formula $CH_2=CH-(CH_2)_n-CH=O$ or unsaturated alcohols having a general formula $CH_2=CH-(CH_2)_n-CH-OH$, wherein n=1 to 17. Preferably, an organic fragment is an organic molecule, which is an unsaturated aldehyde having a general formula $CH_2=CH-(CH_2)_n-CH=O$. In particular, examples of preferred organic molecules are undecylenic aldehyde having a formula $CH_2=CH-(CH_2)_8-CH=O$, 4-pentenal having a formula $CH_2=CH-(CH_2)_2-CH=O$, and 2,2-dimethyl-4-pentenal having a formula $CH_2=CH-CH_2C(CH_3)_2-CH=O$.

Acetalisation refers to a reversible reaction in organic chemistry involving the formation of an acetal. In an acetalization reaction, two functional hydroxyl groups form an acetal with a functional aldehyde group. Acetals are stable with respect to hydrolysis by bases and with respect to many oxidizing and reducing agents.

An acetal may be provided by addition of a first hydroxyl group followed by addition of a second hydroxyl group to a carbonyl group of an aldehyde. An acetal is characterised by a central carbon atom having four bonds, the central carbon atom having a following connectivity

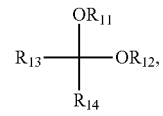

wherein $R_{11}$, $R_{12}$, $R_{13}$ and $R_{14}$ refer to groups connected to the acetal. An acetal in this application refers to a functional group formed in an acetalisation reaction between the first moiety and the second moiety of an organic compound. An acetal may be provided by arranging an acetalisation reaction between nanofibrillar cellulose and an organic fragment. After the acetalisation reaction, the first moiety comprises the nanofibrillar cellulose, and the second moiety comprises the organic fragment. The organic fragment may further comprise at least one functional vinylic group. The functional groups available in the organic fragment and in the nanofibrillar cellulose participating in the acetalisation reaction define the position of the groups $R_{11}$, $R_{12}$, $R_{13}$ and $R_{14}$ in an organic compound formed by said acetalisation.

Groups $R_{11}$ and $R_{12}$ may be derived from nanofibrillar cellulose having hydroxyl groups and/or from one or more organic fragments having hydroxyl groups. The groups $R_{11}$ and $R_{12}$ may represent, for example, two adjacent hydroxyl groups of a single glucopyranose unit in nanofibrillar cellulose connected to the acetal. Alternatively, the groups $R_{11}$ and $R_{12}$ may represent, for example, hydroxyl groups of two separate glucopyranose units in nanofibrillar cellulose connected to the acetal. Alternatively, the groups $R_{11}$ and $R_{12}$ may be, for example, an organic fragment and nanofibrillar cellulose, each group having a different structure, and each group having one or more hydroxyl groups. The groups $R_{11}$ and $R_{12}$ may be from the same organic fragment, for example from an organic polymer having hydroxyl groups. The groups $R_{11}$ and $R_{12}$ may be from two different organic fragments, for example from two identical organic fragments, each organic fragment having one or more hydroxyl groups. The groups $R_{11}$ and $R_{12}$ may be from two different organic fragments, for example from two organic fragments, each organic fragment having a different structure, and each organic fragment having one or more hydroxyl groups.

Groups $R_{13}$ and $R_{14}$ may be derived from an organic fragment having an aldehyde group or from nanofibrillar cellulose having an aldehyde group. The groups $R_{13}$ and $R_{14}$ may be from a single organic fragment, for example from an organic molecule having an aldehyde group, wherein $R_{13}$ is a hydrogen atom of the aldehyde group and $R_{14}$ is a linear or branched, saturated or unsaturated hydrocarbon chain having 2 to 20 carbon atoms, optionally interrupted by heteroatoms of N, O, or S. The groups $R_{13}$ and $R_{14}$ may be from nanofibrillar cellulose having an aldehyde group, wherein $R_{14}$ or $R_{13}$ is a hydrogen atom of the aldehyde group and the other group represents the remaining structure of the nanofibrillar cellulose.

Nanofibrillar cellulose obtained from primary cellulose and participating in the acetalisation reaction may comprise functional hydroxyl groups. Nanofibrillar cellulose participating in the acetalisation reaction may be oxidised and comprise functional aldehyde groups.

The organic fragment participating in the acetalisation reaction may be an organic molecule comprising a linear or branched, saturated or unsaturated hydrocarbon chain having 2 to 20 carbon atoms, optionally interrupted by heteroatoms of N, O, or S, the organic molecule comprising at least one functional vinylic group. The organic fragment participating in the acetalisation reaction may be an organic molecule such as an unsaturated aldehyde or an unsaturated alcohol, as described above. The organic fragment participating in the acetalisation reaction may be a water soluble carrier polymer, such as polyvinyl alcohol, comprising at least one functional vinylic group. The organic fragment participating in the acetalisation reaction may be a water soluble carrier polymer connected to an organic molecule comprising at least one functional vinylic group.

When providing an organic polymer having hydroxyl groups, such as polyvinyl alcohol or an organic molecule such as an unsaturated alcohol, the functional groups of the organic fragment participating in the acetalisation reaction may be functional hydroxyl groups.

When providing an organic molecule such as an unsaturated aldehyde, the functional groups of the organic fragment participating in the acetalisation reaction may be functional aldehyde groups.

A hemiacetal is characterised by a central carbon atom having four bonds, the central carbon atom having a following connectivity:

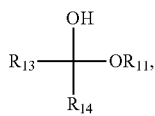

wherein $R_{11}$, $R_{13}$ and $R_{14}$ refer to groups as described above. Hemiacetal refers to a functional group formed between organic compounds by addition of a first hydroxyl group to a carbonyl group of an aldehyde. A hemiacetal can react with an alcohol under acidic conditions to form an acetal, and can dissociate to form an aldehyde and an alcohol. Hemiacetals in general are described as intermediates in the reaction between alcohols and aldehydes, with the final product being an acetal. While hemiacetals in general are unstable compounds in comparison to acetals, an organic compound comprising a first moiety and a second moiety may be connected by a hemiacetal.

A method for obtaining a release liner comprising nanofibrillar cellulose may comprise:
  providing a cellulose based support layer,
  providing an organic compound comprising a first moiety and a second moiety connected by an acetal by arranging an acetalisation reaction between nanofibrillar cellulose and an organic fragment, and
  applying the organic compound on a surface of the cellulose based support layer to form a release liner comprising a primer layer and the cellulose based support layer,
wherein after the acetalisation reaction the first moiety comprises the nanofibrillar cellulose obtained from primary cellulose comprising functional hydroxyl groups and the second moiety comprises the organic fragment, the organic fragment comprising at least one functional vinylic group.

The method may further comprise oxidizing the primary cellulose or the nanofibrillar cellulose to provide nanofibrillar cellulose having functional aldehyde groups to at least some extent. The nanofibrillar cellulose may comprise an amount of functional aldehyde groups of at least 0.02 mmol/g of the amount of the primary cellulose. When an organic compound refers to a elements connected to each other by an acetal, the organic compound may also be denoted as an acetalised compound.

Preferably, in the method above, the first moiety is nanofibrillar cellulose, which is connected by an acetal to the second moiety, which second moiety is an organic molecule comprising a vinylic group. Preferably the second moiety is an unsaturated aldehyde having a general formula $CH_2\!=\!CH\!-\!(CH_2)_n\!-\!CH\!=\!O$, in particular an undecylenic aldehyde having a formula $CH_2\!=\!CH\!-\!(CH_2)_8\!-\!CH\!=\!O$, a 4-pentenal having a formula $CH_2\!=\!CH\!-\!(CH_2)_2\!-\!CH\!=\!O$, or a 2,2-dimethyl-4-pentenal having a formula $CH_2\!=\!CH\!-\!CH_2C(CH_3)_2\!-\!CH\!=\!O$. In aqueous dispersions, compared to primary alcohols, aldehydes are more reactive and thus most favoured in industrial processes.

In the method above, when the first moiety is nanofibrillar cellulose comprising at least some aldehyde groups, the second moiety may be an unsaturated alcohol having a general formula $CH_2\!=\!CH\!-\!(CH_2)_n\!-\!CH\!-\!OH$, wherein n=1 to 17. However, to promote the acetalisation reaction, the unsaturated alcohol is preferably a diol comprising at least one functional vinylic group, the diol having at least two functional hydroxyl groups, which enable a ring formation between the nanofibrillar cellulose and the unsaturated alcohol.

Example 1: A Method for an Acetalisation Reaction Comprising Nanofibrillar Cellulose Below are presented some parameters suitable for an acetalisation reaction comprising nanofibrillar cellulose, which may be used in the method above.

Preferably, the process is a batch process, which enables an efficient mixing of the raw material. The nanofibrillar cellulose is introduced into the process as pre-mixed to a given concentration, or mixed with water to obtain an aqueous dispersion. The nanofibrillar cellulose dispergation may optionally comprise a dilution step, to adjust the concentration of the nanofibrillar cellulose in the reaction. A nanofibrillar cellulose concentration equal to or less than 4%, such as in the range of 0.5 to 3% by weight has been found to enable a good mixing, as a high viscosity restricts the mixing of the organic fragment later. A nanofibrillar cellulose concentration equal to or less than 4%, such as in the range of 0.5 to 3% by weight is therefore preferred. Mixing of the raw material is possible even in a higher concentration of the nanofibrillar cellulose, such as above 4% by weight. In a higher nanofibrillar cellulose concentration the dispergation of the nanofibrillar cellulose is, however, less effective. While a higher nanofibrillar cellulose concentration is possible, it may have an effect on the yield of the acetalisation reaction. Reduced dispergation of nanofibrillar cellulose in the reaction may lead to decreased levels of acetal formation.

The pH of the mixture is adjusted to acidic, and the reaction temperature of the mixture is controlled. The acetalisation reaction in an aqueous medium takes place in an acidic pH. The pH of the medium may be in the range of 1.5 to 4, such as equal to or less than 4, preferably equal to or less than 3 or even equal to or less than 2, such as equal to 1.5. The adjustment of the pH in the aqueous medium may be done with a suitable acid. A suitable acid is, for example, sulphuric acid or hydrochloric acid.

The reaction temperature of may be in the range of 20 to 120° C., preferably less than 120° C., such as in the range of 50 to 100° C., most preferably in the range of 60 to 80° C.

When a suitable reaction temperature and pH level have been reached, the organic fragment is introduced into the aqueous solution gradually. By gradually it is meant, that a dropwise addition of the solution containing the organic fragment, the temperature and pH of the reaction medium may be maintained at sufficient levels. The addition of the organic fragment may be facilitated by providing a premixed dispersion or solution, wherein the organic fragment has been diluted to an amount of water. The organic fragment, such as 2,2-dimethyl-4-pentenal or undecylenic aldehyde, is typically added in an amount up to 30% by weight of the nanofibrillar cellulose, such as in the range of 1 to 30% by weight, preferably in the range of 5 to 20% by weight, most preferably in the range of 7 to 15% by weight of the nanofibrillar cellulose.

The acetalisation reaction takes place in the range of ca. 30 minutes to 2 hours, typically within an hour, such as in the range of 30 minutes to 60 minutes. The acetalisation reaction may be finished by increasing the pH of the medium with a suitable alkaline, such as with sodium hydroxide (NaOH). An increase of the pH to a level in the range of 5 to 7 is in general sufficient to stop the reaction.

Below are illustrated, by way of examples, some embodiments for a method for obtaining a release liner comprising nanofibrillar cellulose.

A method for obtaining a release liner comprising nanofibrillar cellulose may preferably comprise an acetalisation reaction, where an acetal is formed between nanofibrillar cellulose and an unsaturated aldehyde having a general formula $CH_2=CH-(CH_2)_n-CH=O$, wherein n=1 to 17. The hydrocarbon chain between the vinylic group and the aldehyde group may optionally be branched and/or unsaturated hydrocarbon chain, optionally interrupted by heteroatoms of N, O, or S.

A method for obtaining a release liner comprising nanofibrillar cellulose may comprise an acetalisation reaction, where an acetal is formed between nanofibrillar cellulose comprising functional aldehyde groups and a water soluble carrier polymer, such as polyvinyl alcohol (PVA) comprising functional hydroxyl groups. The water soluble carrier polymer participating in the acetalisation reaction may be further connected to at least one organic molecule, said organic molecule comprising at least one functional vinylic group. The organic molecule may be obtainable from an acetalisation reaction of, for example, polyvinyl alcohol and an organic molecule such as unsaturated aldehyde having a general formula $CH_2=CH-(CH_2)_n-CH=O$, wherein n=1 to 17. The hydrocarbon chain between the vinylic group and the aldehyde group may optionally be branched and/or unsaturated hydrocarbon chain, optionally interrupted by heteroatoms of N, O, or S. Alternatively, the organic molecule comprising a functional vinylic group may have been grafted to the water soluble carrier polymer. The vinylic groups in the organic compound may participate in a crosslinking reaction with the vinylic groups of the silicon polymer, when the release liner is coated with a release coating and cured.

A method for obtaining a release liner comprising nanofibrillar cellulose may comprise an acetalisation reaction, where an acetal is formed between nanofibrillar cellulose comprising functional hydroxyl groups, and polyvinyl alcohol comprising functional hydroxyl groups and an organic fragment selected from an unsaturated aldehyde having a general formula $CH_2=CH-(CH_2)_n-CH=O$, wherein n=1 to 17, preferably an undecylenic aldehyde having a formula $CH_2=CH-(CH_2)_8-CH=O$, a 4-pentenal having a formula $CH_2=CH-(CH_2)_2-CH=O$, or a 2,2-dimethyl-4-pentenal having a formula $CH_2=CH-CH_2C(CH_3)_2-CH=O$.

A method for obtaining a release liner comprising nanofibrillar cellulose may comprise an acetalisation reaction, where an acetal is formed between nanofibrillar cellulose comprising functional aldehyde groups, and polyvinyl alcohol comprising functional hydroxyl groups and an organic fragment selected from an unsaturated alcohol having a general formula $CH_2=CH-(CH_2)_n-CH-OH$, wherein n=1 to 17, or preferably a diol comprising at least one functional vinylic group.

A method for obtaining a release liner comprising nanofibrillar cellulose may comprise an acetalisation reaction, where an acetal is formed between nanofibrillar cellulose comprising functional hydroxyl groups, and an organic fragment selected from an unsaturated aldehyde having a general formula $CH_2=CH-(CH_2)_n-CH=O$, wherein n=1 to 17, preferably an undecylenic aldehyde having a formula $CH_2=CH-(CH_2)_8-CH=O$, a 4-pentenal having a formula $CH_2=CH-(CH_2)_2-CH=O$, or a 2,2-dimethyl-4-pentenal having a formula $CH_2=CH-CH_2C(CH_3)_2-CH=O$.

A method for obtaining a release liner comprising nanofibrillar cellulose may comprise an acetalisation reaction, where an acetal is formed between nanofibrillar cellulose comprising functional aldehyde groups, and an organic fragment selected from an unsaturated alcohol having a general formula $CH_2=CH-(CH_2)_n-CH-OH$, wherein n=1 to 17, or preferably an undecylenic alcohol having a formula $CH_2=CH-(CH_2)_8-CH-OH$.

Figure 7:
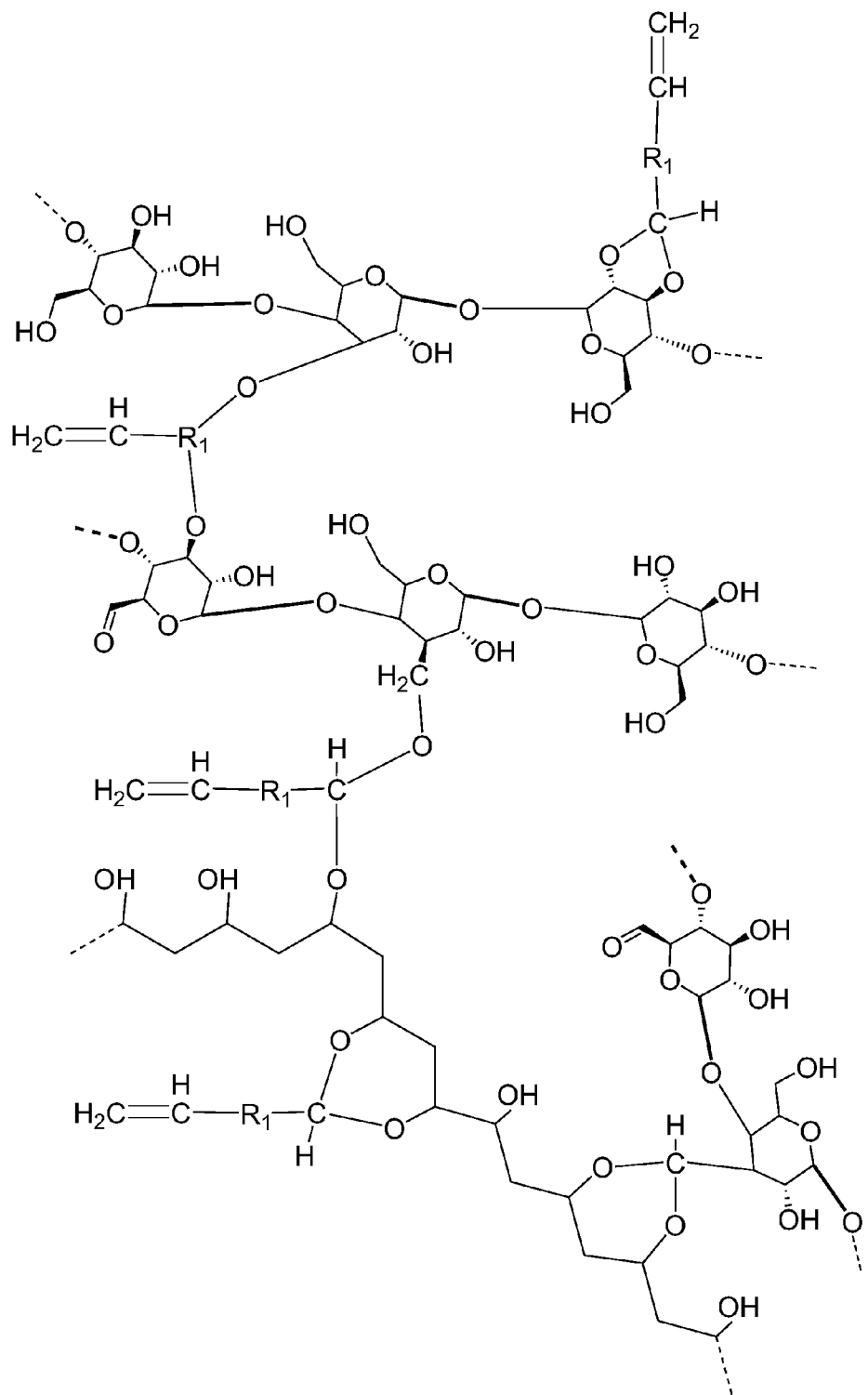
FIG. 7 illustrates, by way of an example, an organic compound comprising a first moiety and a second moiety connected by at least one acetal.

FIG. 7 illustrates, by way of an example, some moieties obtainable from an acetalisation reaction of nanofibrillar cellulose, a water soluble carrier polymer comprising functional hydroxyl groups, such as polyvinyl alcohol, and an organic fragment comprising a functional vinylic group. By selecting the reagents participating in the acetalisation reaction, different organic compounds may be obtained. In addition, one or more acetalisation reactions may be arranged to provide an organic compound comprising a first moiety and a second moiety connected by an acetal, wherein after the acetalisation reaction the first moiety comprises the nanofibrillar cellulose obtained from primary cellulose comprising functional hydroxyl groups and the second moiety comprises the organic fragment, the organic fragment comprising at least one functional vinylic group.

Acetalisation of nanofibrillar cellulose as described above provides a tight primer layer comprising functional vinylic groups and functional hydroxyl groups, which may both improve the anchorage of a silicon polymer based release coating to the primer layer and provide a closed substrate layer surface. After forming the primer layer, the vinylic groups of the organic compounds are available to participate in a cross-linking reaction with other vinylic groups when providing a top layer comprising a silicon polymer based release coating. In combination, there are provided means to reduce both the amount of release coating and platinum catalyst required to obtain a release liner comprising a top layer.

Figure 8:
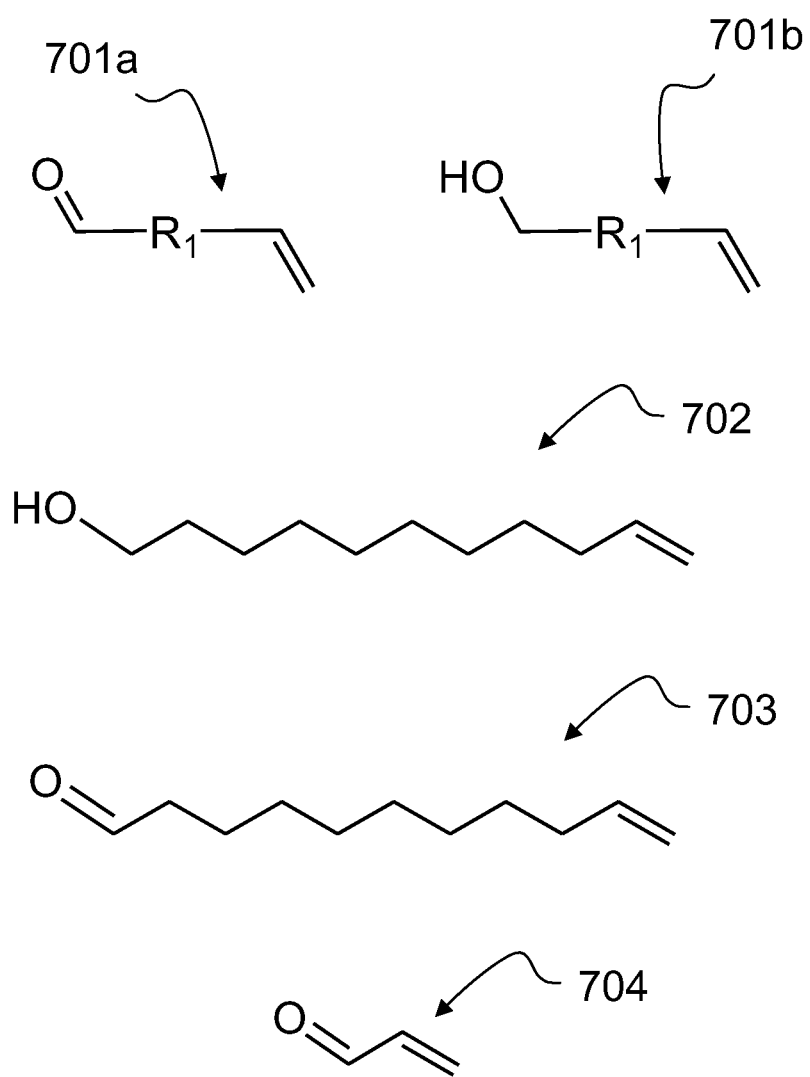
FIG. 8 illustrates, by way of examples, general formulas for organic molecules having a first reactive group and a second reactive group.

FIG. 8 illustrates, by way of an example, general formulas for an organic molecule having a first reactive group and a second reactive group, which organic molecule may be used in an acetalisation reaction. An organic molecule 701a may have a first reactive group and a second reactive group, wherein the first reactive group may be a functional aldehyde group and the second reactive group may be a functional vinylic group. An organic molecule 701b may have a first reactive group and a second reactive group, wherein the first reactive group may be a functional hydroxyl group and the second reactive group may be a functional vinylic group. The organic molecule 701a, 701b comprising the at least one functional vinylic group may further comprise a linear or branched, saturated or unsaturated hydrocarbon chain $R_1$ having 2 to 20 carbon atoms, optionally interrupted by heteroatoms of N, O, or S.

Acrolein 704 is an example of an organic molecule having a first reactive group and a second reactive group in the organic molecule, wherein the first reactive group is a functional aldehyde and the second reactive group is a functional vinylic group. However, acrolein lacks the unsaturated hydrocarbon chain $R_1$ between the first reactive group and the second reactive group, and is not optimal in promoting the functionality of the primer layer comprising nanofibrillar cellulose. Furthermore, acrolein is toxic and volatile organic molecule and therefore not suitable for industrial process environments.

The acetalisation reaction may be arranged either before or after disintegrating primary or oxidised cellulose to nanofibrillar cellulose. However, disintegration of primary or oxidised cellulose may comprise significant mechanical shear forces. Preferably, the acetalisation reaction is arranged after disintegrating the oxidised cellulose to nanofibrillar cellulose.

Preferably the first reactive group and the second reactive group are positioned as end groups of the organic molecule 701a, 701b. An example of an organic molecule, wherein the first reactive group is a functional hydroxyl group and the second reactive group is a functional vinylic group, is undecylenic alcohol 702. Oxidised cellulose or nanofibrillar cellulose comprising functional aldehyde groups may be acetalised with undecylenic alcohol 702. A preferred example of an organic molecule, wherein the first reactive group is a functional aldehyde group and the second reactive group is a functional vinylic group, is undecylenic aldehyde 703. Cellulose or nanofibrillar cellulose comprising functional hydroxyl groups may be acetalised with undecylenic aldehyde 703.

Figure 9:
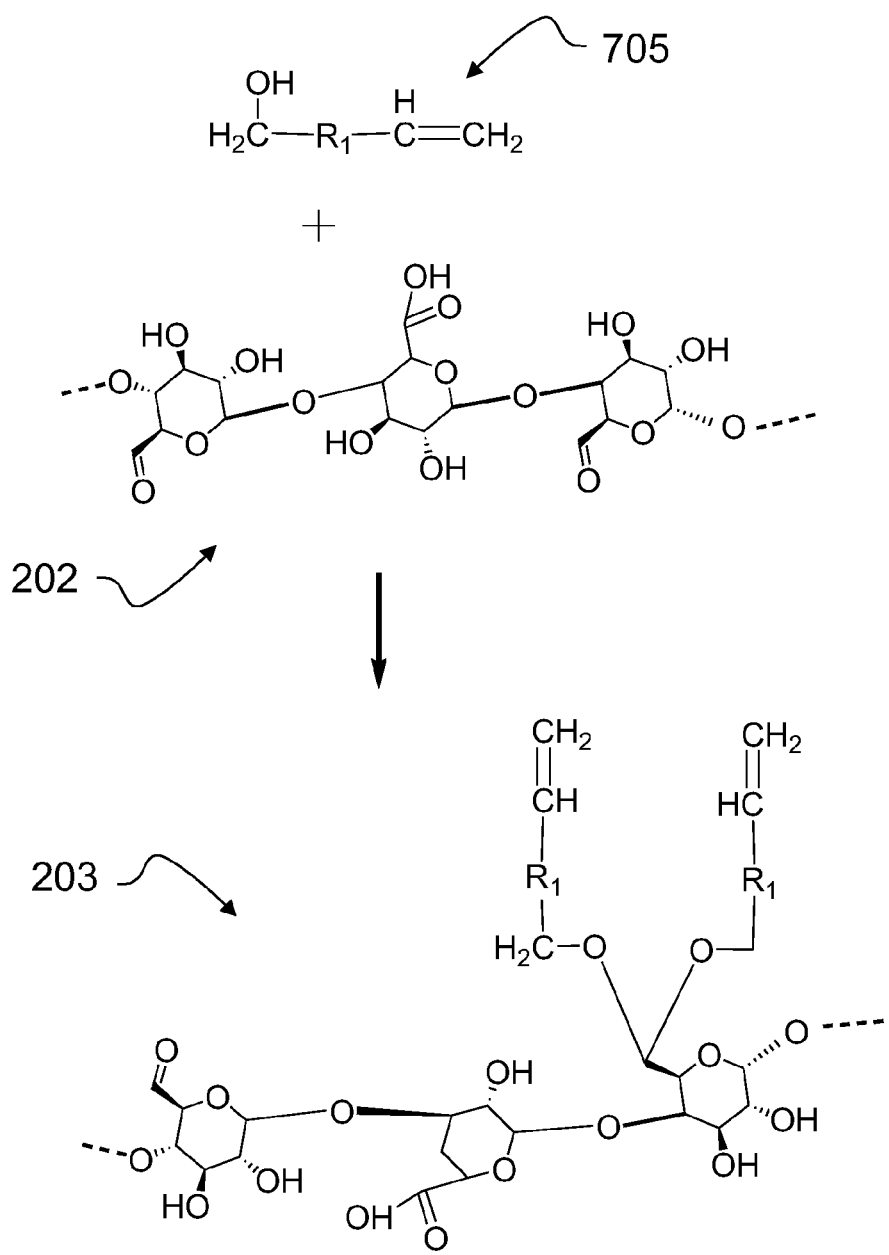
FIG. 9 illustrates, by way of an example, a schematic acetalisation reaction between oxidised cellulose with an organic molecule comprising a reactive hydroxyl group and a reactive vinylic group, wherein the oxidised cellulose may be nanofibrillar cellulose.

FIG. 9 illustrates, by way of an example, an acetalisation reaction, wherein oxidised cellulose 202 before or after disintegration to nanofibrillar cellulose is acetalised with an organic fragment, wherein the organic fragment participating in the acetalisation reaction is an unsaturated alcohol 705 having a general formula $CH_2=CH-(R_1)-CH-OH$, wherein $R_1$ is a linear or branched, saturated or unsaturated hydrocarbon chain having 2 to 20 carbon atoms, optionally interrupted by heteroatoms of N, O, or S. The acetalisation reaction between a functional aldehyde group of the oxidised cellulose 202 and hydroxyl groups of two unsaturated alcohol molecules 705 provides an organic compound 203 comprising a first moiety and a second moiety connected by an acetal, wherein after the acetalisation reaction the first moiety comprises the nanofibrillar cellulose having functional aldehyde groups to at least some extent and the second moiety comprises the organic fragment, the organic fragment comprising at least one functional vinylic group. The oxidation method of cellulose may be chosen such that the acetals may be formed into different positions of the glucopyranose units in the nanofibrillar cellulose. The oxidation method of cellulose may be selective, for example to the C-6 positions or the C-2 positions and the C-3 positions in the cellulose glucopyranose units.

Figure 10:
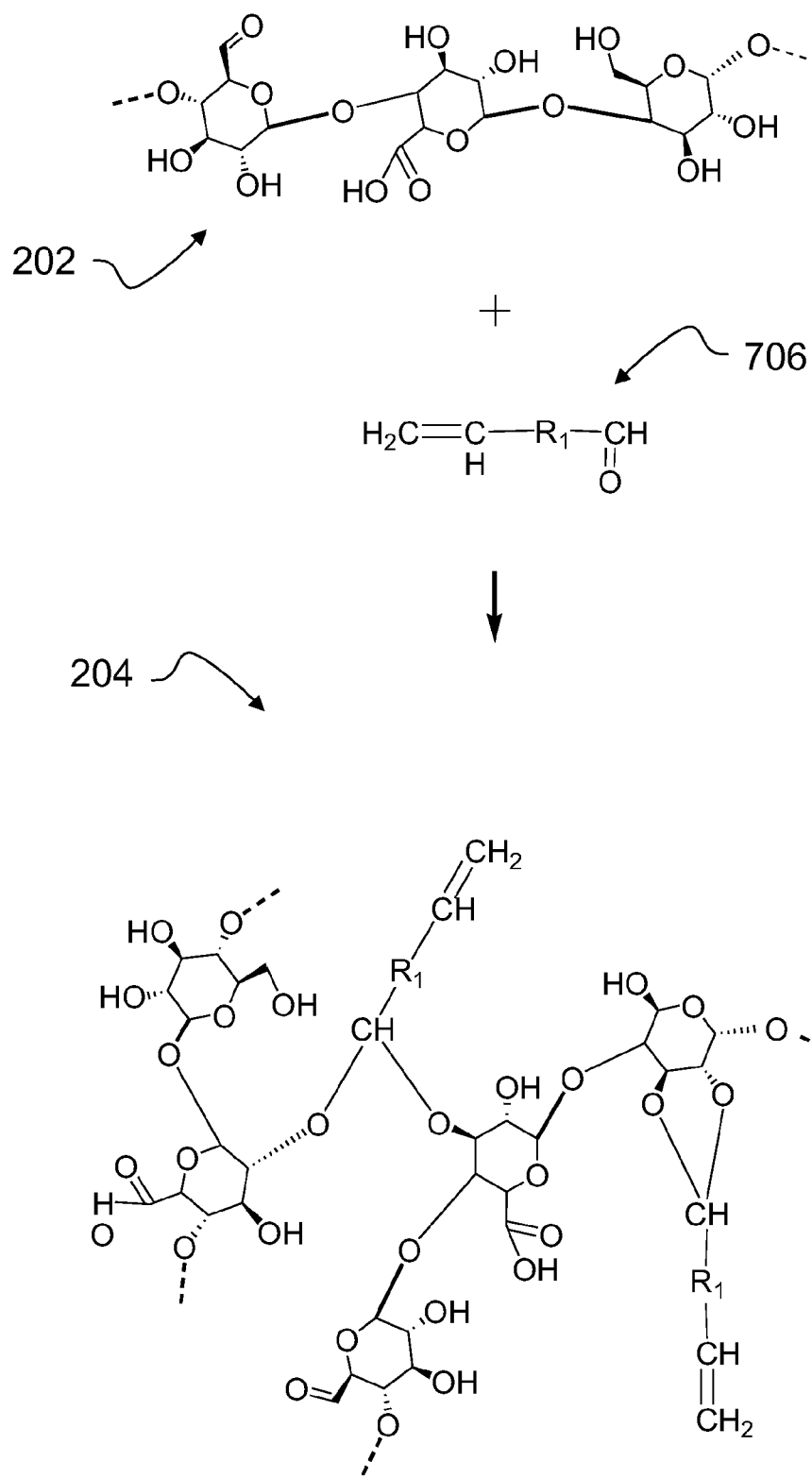
FIG. 10 illustrates, by way of an example, a schematic acetalisation reaction between oxidised cellulose with an organic molecule comprising a reactive aldehyde group and a reactive vinylic group, wherein the oxidised cellulose may be nanofibrillar cellulose.

FIG. 10 illustrates, by way of an example, an acetalisation reaction, wherein oxidised cellulose 202 before or after disintegration to nanofibrillar cellulose is acetalised with an organic fragment, wherein the organic fragment participating in the acetalisation reaction is an unsaturated aldehyde 706 having a general formula $CH_2=CH-(R_1)-CH=O$, wherein $R_1$ is a linear or branched, saturated or unsaturated hydrocarbon chain having 2 to 20 carbon atoms, optionally interrupted by heteroatoms of N, O, or S. The acetalisation reaction between two functional hydroxyl group of the oxidised cellulose 202 and an aldehyde group of the unsaturated aldehyde molecules 706 provides an organic compound 204 comprising a first moiety and a second moiety connected by an acetal, wherein after the acetalisation reaction the first moiety comprises the nanofibrillar cellulose and the second moiety comprises the organic fragment, the organic fragment comprising at least one functional vinylic group. The oxidation method of cellulose may be chosen such that the acetals may be formed between different positions of glucopyranose units in the nanofibrillar cellulose. The oxidation method of cellulose may be selective, for example to the C-6 positions or the C-2 positions and the C-3 positions in the cellulose glucopyranose units. The acetals may be formed between adjacent hydroxyl groups in a single glucopyranose unit of a nanofibrillar cellulose chain. In addition, or alternatively, acetals may be formed between two glucopyranose units of two nanofibrillar cellulose chains close to each other.

Figure 11:
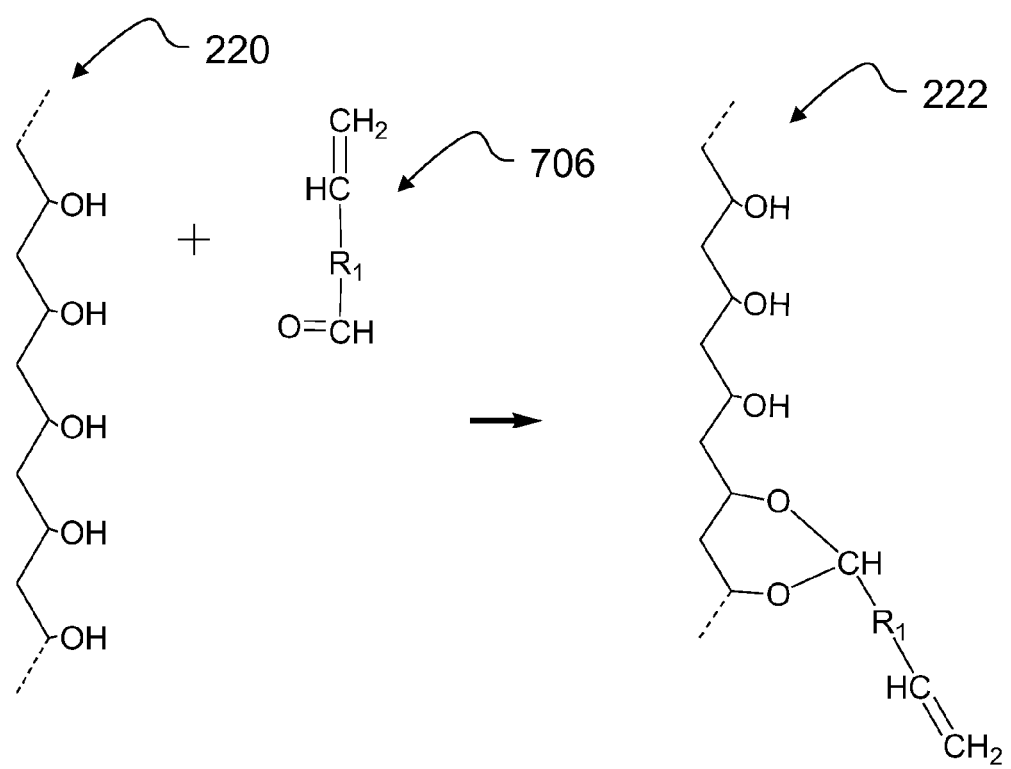
FIG. 11 illustrates, by way of an example, an embodiment for providing an organic fragment comprising at least one functional vinylic group by acetalisation reaction.

FIG. 11 illustrates, by way of an example, one embodiment of providing an organic fragment 222 by acetalisation, wherein the organic fragment 222 is a water soluble carrier polymer 220 comprising at least one functional vinylic group. An organic molecule 706 participating in the acetalisation reaction may be an organic molecule comprising a linear or branched, saturated or unsaturated hydrocarbon chain having 2 to 20 carbon atoms, optionally interrupted by heteroatoms of N, O, or S, the organic molecule comprising at least one functional vinylic group. The water soluble carrier polymer 220 may be polyvinyl alcohol 220.

Figure 12:
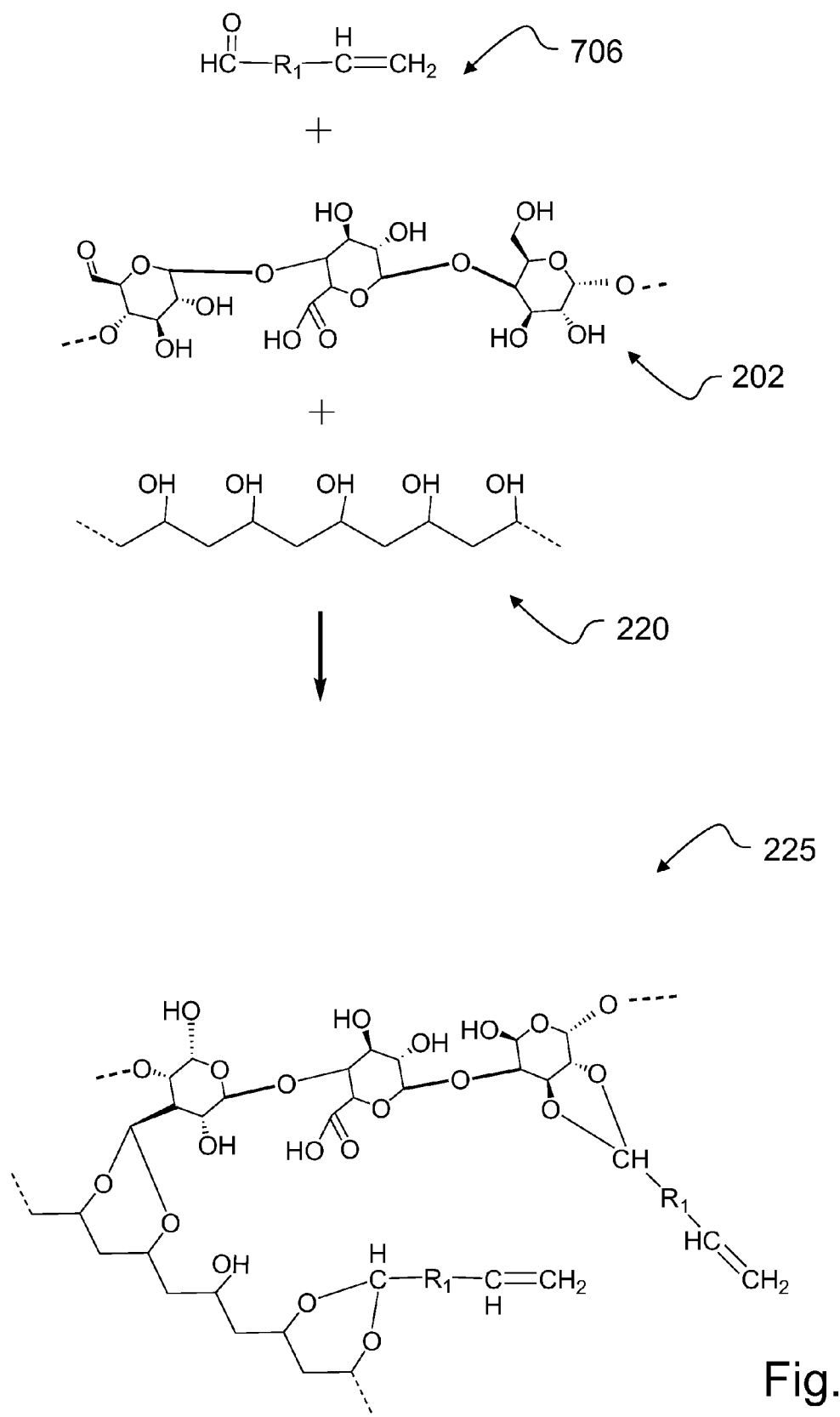
FIG. 12 illustrates, by way of an example, schematically one or more acetals, which may be formed in an acetalisation reaction in the presence of nanofibrillar cellulose, polyvinyl alcohol and organic molecule or a combination of these.

FIG. 12 is illustrates, by way of an example, an acetalisation reaction, between oxidised cellulose 202 comprising functional hydroxyl groups and at least some functional aldehyde groups, water soluble carrier polymer 220 comprising functional hydroxyl groups and an organic molecule 706, wherein the organic molecule 706 participating in the acetalisation reaction is an unsaturated aldehyde 706 having a general formula $CH_2=CH-(R_1)-CH=O$, wherein $R_1$ is a linear or branched, saturated or unsaturated hydrocarbon chain having 2 to 20 carbon atoms, optionally interrupted by heteroatoms of N, O, or S. A first acetalisation reaction may be arranged between two functional hydroxyl group of the oxidised cellulose 202 and the aldehyde group of the unsaturated aldehyde molecule 706. A second acetalisation reaction may be arranged between two functional hydroxyl groups of the water soluble carrier polymer 220 and the aldehyde group of the unsaturated aldehyde molecule 706. A third acetalisation reaction may be arranged between two functional hydroxyl groups of the water soluble carrier polymer 220 and the aldehyde group of the oxidised cellulose 202. Acetalisation reactions may be arranged to provide an organic compound 225 comprising a first moiety and a second moiety connected by one or more acetals, wherein after the acetalisation reaction the first moiety comprises the nanofibrillar cellulose having functional aldehyde groups to at least some extent and the second moiety comprises the organic fragment, the organic fragment comprising at least one functional vinylic group.

Variations of the above-described method may be arranged. For example, separate acetalisation reactions may be arranged. Acetalisation reactions may be arranged before providing the organic compound comprising the first moiety and the second moiety to obtain different amounts of acetals at different positions of an organic compound.

In particular, according to an embodiment a method for obtaining a release liner comprising nanofibrillar cellulose may comprise:
  providing a cellulose based support layer,
  providing nanofibrillar cellulose and an organic fragment, and
  applying the nanofibrillar cellulose and the organic fragment on a surface of the cellulose based support layer to form a release liner comprising a primer layer and the cellulose based support layer, wherein the organic fragment comprises an acetal and at least one functional vinylic group before forming the release liner comprising the primer layer.

In this embodiment, the organic fragment has been obtained by acetalisation reaction, wherein the organic fragment has been a water soluble carrier polymer such as polyvinyl alcohol comprising at least one functional vinylic group. The organic fragment may be provided by arranging an acetalisation reaction with the water soluble carrier polymer and an organic molecule comprising a linear or branched, saturated or unsaturated hydrocarbon chain having 2 to 20 carbon atoms, optionally interrupted by heteroatoms of N, O, or S, the organic molecule comprising an aldehyde group and at least one functional vinylic group. Preferably the aldehyde group and the functional vinylic group are terminal groups.

A release liner according to the embodiment may comprise a primer layer and a cellulose based support layer, the primer layer comprising nanofibrillar cellulose and an organic fragment having one or more functional vinylic groups, the organic fragment comprising an acetal and at least one functional vinylic group.

Method of Obtaining a Release Liner Comprising Nanofibrillar Cellulose

As explained above, nanofibrillar cellulose provides means to improve the primer layer functionality. For example, when using nanofibrillar cellulose to increase the surface tightness, the surface porosity may be reduced and the barrier properties of the release liner may be improved. In addition, when using nanofibrillar cellulose, the primer layer surface area may be increased. In particular, an organic compound comprising nanofibrillar cellulose may be applied on a surface of the cellulose based support layer to form a release liner comprising a primer layer and a cellulose based support layer. A primer layer comprising nanofibrillar cellulose may be used to improve surface coverage and anchorage of the top layer to the primer layer. The presence of nanofibrillar cellulose comprising hydroxyl groups may further promote hydrogen bonding of the nanofibrillar cellulose in the primer layer with the cellulose based support layer. The presence of nanofibrillar cellulose comprising aldehyde groups may further promote covalent bonding of the nanofibrillar cellulose in the primer layer with the cellulose based support layer.

A method for obtaining a release liner comprising nanofibrillar cellulose may comprise providing a cellulose based support layer. Preferably, the cellulose based support layer is coated paper having a grammage equal to or more than 38 g/m$^2$ are used, for example in the range of 38 to 150 g/m$^2$.

Organic compound, such as prepared according to Example 1 above, may be applied on a surface of the cellulose based support layer in an amount of 0.1 to 20 g/m$^2$, preferably in an amount of 1 to 5 g/m$^2$. The organic compound may be applied as such, providing a primer layer consisting essentially of the organic compound. Typically, the organic compound is applied as a primer layer mixture, wherein the primer layer mixture comprises the organic compound up to 100% by the weight of the primer layer such as in the range of 0.1% to 99% by the weight of the primer layer. Preferably the primer layer mixture comprises the organic compound up to 70% by weight of the primer layer, such as in the range of 0.5% to 70% by weight of the primer layer. Most preferably the primer layer mixture comprises the organic compound up to 35% by weight of the primer layer, such as in the range of 0.6% to 35% by weight of the primer layer. The organic compound may be applied as a mixture by using a surface coating application process, such as size-press.

The organic compound comprises nanofibrillar cellulose and an organic fragment participating in the acetalisation reaction. When the organic fragment is an organic molecule comprising a functional vinylic group, such as an unsaturated aldehyde, preferably an undecylenic aldehyde, a 2,2-dimethyl-4-pentenal or a 4-pentenal, the organic fragment is typically added in an amount up to 30% by weight of the organic compound, such as in the range of 0.2 to 30% by weight, preferably in the range of 0.5 to 20% by weight, most preferably in the range of 1 to 15% by weight of the organic compound.

The primer layer may comprise the nanofibrillar cellulose equal to or less than 5%, such as in the range of 0.1 to 5%, preferably equal to or less than 4%, such as in the range of 0.2 to 3.5%, most preferably equal to or less than 3%, such as in the range of 0.3 to 3% by weight of the primer layer. The primer layer may comprise the nanofibrillar cellulose, for example equal to or less than 1%, such as in the range of 0.1. to 1% by weight of the primer layer.

After applying the organic compound on the surface of the cellulose based support layer, the formed primer layer is dried. The substrate layer comprising the primer layer may further be remoisturized and calendered. The calender may be a multi-nip calender or a supercalender.

Figure 13:
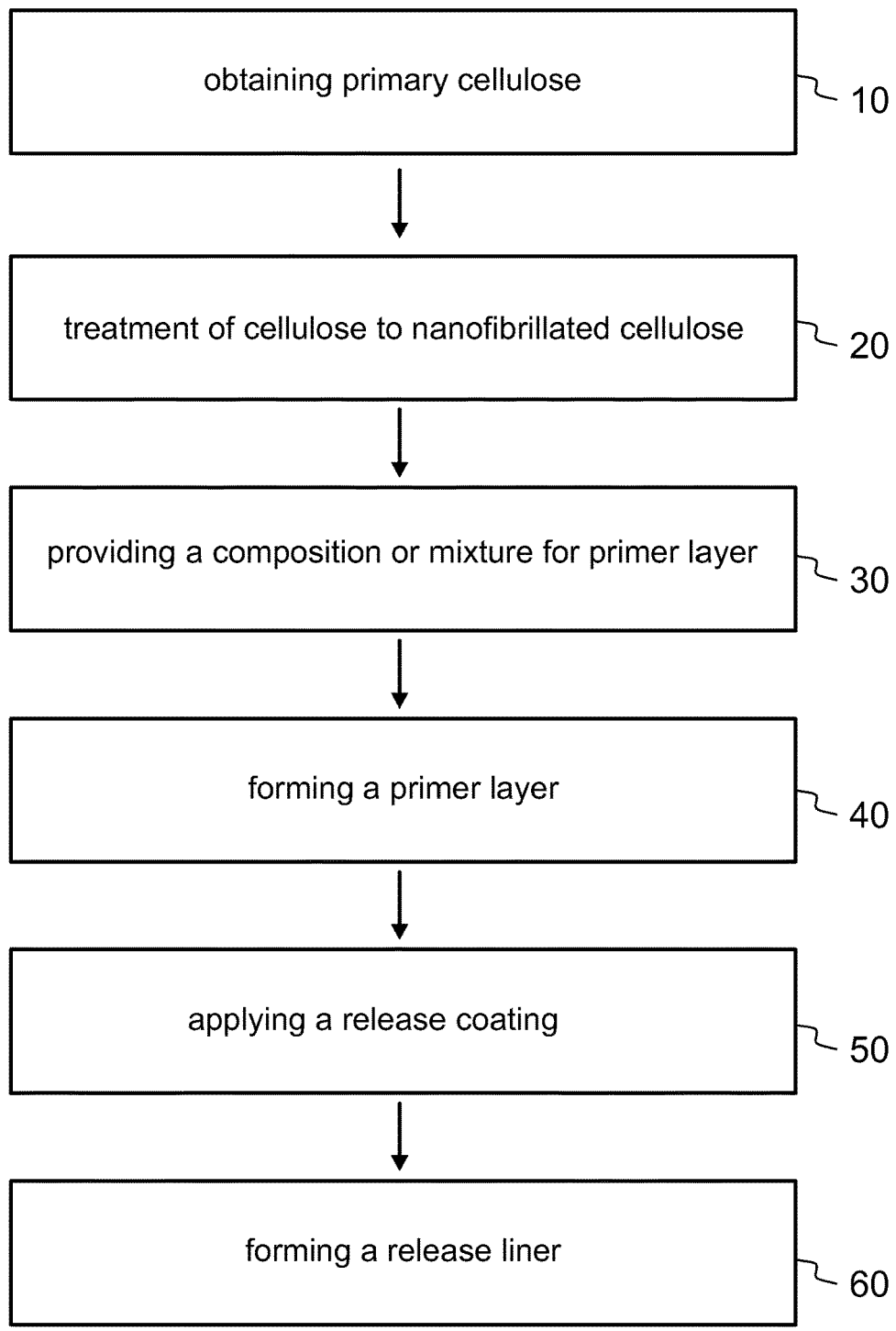
FIG. 13 illustrates, by way of an example, a method for providing a release liner comprising nanofibrillar cellulose.

FIG. 13 illustrates, by way of an example, a method for providing a release liner comprising nanofibrillar cellulose. The method comprises a step of obtaining primary cellulose 10, which is processed further by a treatment step 20. The treatment step 20 of primary cellulose to nanofibrillar cellulose comprises a mechanical disintegration, wherein the primary cellulose is shredded into smaller fragments of nanofibrillar cellulose. The treatment step 20 may further comprise an oxidation treatment of primary cellulose or nanofibrillar cellulose, wherein selected functionality is provided to the nanofibrillar cellulose. The nanofibrillar cellulose may be used in providing an organic compound comprising a first moiety and a second moiety connected by an acetal. After providing a primer layer composition 30 comprising the organic compound, the primer layer composition (also referred to as primer layer mixture) is applied on a surface of the cellulose based support layer to form a release liner comprising a primer layer 40 and the cellulose based support layer. The primer layer may be coated by a top layer by applying a release coating 50, wherein the release coating may comprise a silicone based polymer structure. The forming of a release liner 60 may further comprise arranging a cross-linking reaction within the silicone polymer to form a cured top layer of the release coating.

Characterization of a Release Liner Comprising Nanofibrillar Cellulose

Morphology, particle size and particle size distribution of the nanofibrillar cellulose in the primer layer may be observed, for example by means of atomic force microscopy (AFM), electron microscopy or optical microscopy. For example, the structure of a release liner comprising a primer layer comprising nanofibrillar cellulose may be examined by using scanning electron microscopy, such as field emission scanning electron microscopy (FE-SEM). Image analysis software may be used to measure dimensions such as length, width or diameter of the nanofibrillar cellulose from captured images.

Oxidation degree of the nanofibrillar cellulose may be characterized by means of Fourier-transformed infrared spectroscopy (FT-IR). The presence of carboxylic groups or aldehyde groups after oxidation may be confirmed by FT-IR, for example. In FT-IR, a characteristic bands corresponding to the pyranose ring ether band of cellulose is formed around 1050 cm$^{-1}$. After oxidation, a new band is formed, corresponding to the C=O stretching frequency of carbonyl groups. Aldehydes and carboxyl groups display in FT-IR a C=O band near 1700 cm$^{-1}$.

The presence of aldehyde groups may also be determined by a colorimetric assay method based on reaction with dinitrophenylhydrazine, or by a conductometric titration based on the release of hydrochloric acid (HCl). These methods may in particular be used for surface concentration determination of aldehyde groups in nanofibrillar cellulose. In the conductometric titration, hydroxylamine hydrochloride can be used with aldehyde groups to form oxime and hydrochloric acid. The concentration of hydrochloric acid released from this reaction can be determined by titration with sodium hydroxide solution, from which the amount of aldehyde groups in the nanofibrillar cellulose can be determined.

The presence of aldehyde groups may also be determined from 1H NMR spectrum, wherein the formyl hydrogen center absorbs near δ9, which is a distinctive part of the spectrum for aldehydes. This signal shows the characteristic coupling to any protons on the alpha carbon.

The substrate layer surface density and porosity may be determined by conventional means, for example by using the mercury displacement method.

Rheological Characterization of Nanofibrillar Cellulose:

To verify the success of fibrillation, rheological measurements of samples in the form of nanofibrillar cellulose hydrogels is carried out with a stress controlled rotational rheometer (ARG2, TA instruments, UK) equipped with four-bladed vane geometry. Samples are diluted with deionized water (200 grams) to a concentration of 0.5 wt. % and mixed with a Waring Blender (LB20E*, 0.5 liters) 3×10 seconds (20 000 rpm) with short breaks between the mixing. Rheometer measurement are carried out for the samples. The diameters of the cylindrical sample cup and the vane were 30 mm and 28 mm, respectively, and the length was 42 mm. The steady state viscosity of the hydrogels is measured using a gradually increasing shear stress.

Turbidity Characterization of Nanofibrillar Cellulose:

Turbidity is measured quantitatively using optical turbidity measuring instruments. There are several commercial turbidometers available for measuring quantitatively turbidity. In the present case the method based on nephelometry is used. The units of turbidity from a calibrated nephelometer are called Nephelometric Turbidity Units (NTU). The measuring apparatus (turbidometer) is calibrated and controlled with standard calibration samples, followed by measuring of the turbidity of the diluted NFC sample.

In the method, a nanofibrillar cellulose sample is diluted in water, to a concentration below the gel point of said nanofibrillar cellulose, and turbidity of the diluted sample is measured. Said concentration where the turbidity of the nanofibrillar cellulose samples is measured is 0.1 wt. %. HACH P2100 Turbidometer with a 50 ml measuring vessel is used for turbidity measurements. The dry matter of the nanofibrillar cellulose sample is determined and 0.5 g of the sample, calculated as dry matter, is loaded in the measuring vessel, which is filled with tap water to 500 g and vigorously mixed by shaking for about 30 seconds. Without delay the aqueous mixture is divided into 5 measuring vessels, which are inserted in the turbidometer. Three measurements on each vessel are carried out. The mean value and standard deviation are calculated from the obtained results, and the final result is given as NTU units.

EXPERIMENTS

The viscosity and turbidity of the material comprising nanofibrillar cellulose in the experiments were performed as described above, unless otherwise stated.

Experiment 1

A method for obtaining nanofibrillar cellulose and acetalisation of nanofibrillar cellulose with an unsaturated aldehyde (2,2-dimethyl-4-pentenal)

In an experiment, cellulose material consisting essentially of bleached birch pulp was subjected to an enzymatic treatment. The enzymatic treatment was continued for 3 hours at 50° C., pH 5-6, 100 rpm, in a pulp consistency of 30%. The enzymatic treatment was used to detach fibre bundles of the cellulose raw material to at least some extent. The enzymatic treatment was carried out in a tempered mixer (Lödige process technology, Germany) in the presence of modified *Thermoascus aurantiacus* CBHI/Cel7A enzyme (Roal OY). In an enzymatic treatment, the degree of cell wall unravel can be adjusted by the enzyme dosage and duration of the treatment.

The enzymatic treatment was stopped after 3 hours by heating the reaction mixture to a temperature of 85° C. for a period of 15 minutes, at which temperature the enzyme was inactivated. The enzyme dilution and washing steps the pulp was fibrillated with an Atrex disperser, through its series of counterrotating rotors, 4 passes. The disperser used had a diameter of 850 mm and rotation speed used was 1800 rpm.

The fibrillation treatment was continued until the nanofibrillar cellulose had achieved a zero shear viscosity in the range of 500-20000 Pa·s and a yield stress in the range of 0.5-20 Pa, preferably in the range of 1-5 Pa, when measured at a consistency of 0.5% by weight.

Nanofibrillar cellulose was diluted to 1.5% dispersion, 0.75 g as dry. Temperature was adjusted to 80° C. and pH 2.4. 2,2-dimethyl-4-pentenal (0.1 g) was added drop wise to dispersion. Reaction time was 1 hour. After the reaction pH was increased to pH 5.

Experiment 2

A method for obtaining oxidised nanofibrillar cellulose and acetalisation of oxidised nanofibrillar cellulose with an unsaturated aldehyde (2,2-dimethyl-4-pentenal)

5.8 kg never-dried birch pulp was pulpered and weighted in closed vessel. Consistency was 6.2%. TEMPO catalyst solution was activated with hypochlorite and solution was mixed with pulp. Pulp was shifted to mixing reactor. Temperature of pulp was set to 25° C. 6.5 L (18%) NaClO was added to reactor by pump while pulp was mixed strongly. NaClO addition was over after 110 min. pH was kept around pH 8 during NaClO addition by controlling pumping speed. Temperature of pulp was lifted to 31° C. after NaClO addition and pH was controlled by 1.5 M NaOH until all NaClO was consumed (after 145 min). Strong mixing was continued until all NaClO was consumed. Pulp was washed after oxidation. Carboxylate content of pulp (conductometric titration) was determined, 0.80 mmol COOH/g pulp.

Oxidized cellulose was dispersed to water to consistency of 2.0% (w/w) and run through the Atrex disperser, 2 passes in the same conditions as in example 1. After that the sample was diluted to 1% and it was run 1 more passes through the homogenizer (GEA Niro Soavi Panther). The homogenizing pressure was 600 bar. The fibrillation treatment was continued until the nanofibrillar cellulose had a turbidity below 60 NTU, preferably below 30 NTU.

Nanofibrillar cellulose was diluted to 0.5% dispersion, 0.25 g as dry. Temperature was adjusted to 80° C. and pH 2.4. 2,2-dimethyl-4-pentenal (0.036 g) was added drop wise to dispersion. Reaction time was 30 min. After the reaction pH was increased to pH 5.

Experiment 3

Oxidized nanofibrillar cellulose of Experiment 2 was diluted to 1.0% dispersion, 0.50 g as dry. Polyvinyl alcohol (PVA) was dissolved to water (18 wt % concentration) and 1.5 g of PVA was added to nanofibrillar cellulose dispersion. Temperature was adjusted to 80° C. and pH 2.1. 2,2-dimethyl-4-pentenal (0.120 g) was added drop wise to dispersion. Reaction time was 80 min. After the reaction pH was increased to pH 5.

For the person skilled in the art, it will be clear that modifications and variations of the products according to the present invention are perceivable. The drawings are schematic and for illustrative purposes. The method and the products are not limited solely to the above presented embodiments, but may be modified within the scope of the appended claims.

The invention claimed is:

1. A method for obtaining a substrate layer for a release liner comprising nanofibrillar cellulose, the method comprising:
    providing a cellulose based support layer,
    providing an organic compound comprising a first moiety and a second moiety connected by an acetal by arranging an acetalisation reaction between nanofibrillar cellulose and an organic fragment, and
    applying the organic compound on a surface of the cellulose based support layer to form a release liner comprising a primer layer and the cellulose based support layer,
    wherein after the acetalisation reaction the first moiety comprises the nanofibrillar cellulose obtained from a primary cellulose having functional hydroxyl groups and the second moiety comprises the organic fragment, the organic fragment comprising at least one functional vinylic group.

2. The method according to claim 1, wherein the first moiety and the second moiety are connected by a hemiacetal.

3. The method according to claim 1, further comprising: disintegrating the primary cellulose to the nanofibrillar cellulose by mechanical means.

4. The method according to claim 1, further comprising: oxidizing the primary cellulose or the nanofibrillar cellulose to provide nanofibrillar cellulose having functional aldehyde groups in an amount of at least 0.02 mmol/g of the amount of the primary cellulose.

5. The method according to claim 1, wherein the nanofibrillar cellulose comprises an amount of functional aldehyde groups of at least 0.02 mmol/g of the amount of the primary cellulose.

6. The method according to claim 1, wherein the organic fragment participating in the acetalisation reaction is an unsaturated aldehyde having a general formula $CH_2\!\!=\!\!CH\!\!-\!\!(CH_2)_n\!\!-\!\!CH\!\!=\!\!O$, wherein $n=1$ to 17, or an unsaturated alcohol having a general formula $CH_2\!\!=\!\!CH\!\!-\!\!(CH_2)_n\!\!-\!\!CH\!\!-\!\!OH$, wherein $n=1$ to 17.

7. The method according to claim 1, wherein the organic fragment participating in the acetalisation reaction is a water soluble carrier polymer having functional hydroxyl groups, the water soluble carrier polymer comprising at least one functional vinylic group.

8. The method according to claim 1, wherein the cellulose based support layer is paper.

9. The method according to claim 1, wherein the primer layer comprises the nanofibrillar cellulose equal to or less than 5% by weight of the primer layer.

10. The method according to claim 1, wherein the nanofibrillar cellulose has a number-averaged diameter equal to or less than 400 nm.

11. A substrate layer for a release liner comprising a primer layer and a cellulose based support layer, the primer layer comprising an organic compound having one or more functional vinylic groups, the organic compound comprising an acetal connecting a first moiety and a second moiety, the first moiety comprising nanofibrillar cellulose having functional hydroxyl groups and the second moiety comprising an organic fragment, the organic fragment comprising at least one functional vinylic group.

12. The substrate layer for a release liner according to claim 11, wherein the first moiety and the second moiety are connected by a hemiacetal.

13. The substrate layer for a release liner according to claim 11, wherein the nanofibrillar cellulose comprises functional aldehyde groups.

14. The substrate layer for a release liner according to claim 11, wherein the organic fragment comprises a linear or branched, saturated or unsaturated hydrocarbon chain having 2 to 20 carbon atoms, optionally interrupted by heteroatoms of N, O, or S, the organic molecule comprising at least one functional vinylic group.

15. The substrate layer for a release liner according to claim 11, wherein the organic fragment is obtainable from the acetalisation reaction of an unsaturated aldehyde having a general formula $CH_2=CH-(CH_2)_n-CH=O$, wherein $n=1$ to 17, or an unsaturated alcohol having a general formula $CH_2=CH-(CH_2)_n-CH-OH$, wherein $n=1$ to 17.

16. The substrate layer for a release liner according to claim 11, wherein the organic fragment is obtainable from an acetalisation reaction of a water soluble carrier polymer having functional hydroxyl groups, the water soluble carrier polymer comprising at least one functional vinylic group.

17. The substrate layer for a release liner according to claim 11, wherein the cellulose based support layer is paper.

18. The substrate layer for a release liner according to claim 11, wherein the nanofibrillar cellulose has a number-averaged diameter equal to or less than 400 nm, preferably 200 nm, preferably 100 nm.

19. The substrate layer for a release liner according to claim 11, comprising the nanofibrillar cellulose equal to or less than 5% by weight of the primer layer.

20. The substrate layer for a release liner according to claim 11, further comprising a top layer, such as a release coating.

21. A labelstock comprising the substrate layer for a release liner according to claim 11 and an adhesive label, the adhesive label attached to the primer layer side of the substrate layer for a release liner.

* * * * *